United States Patent
Rimmelspacher et al.

(10) Patent No.: US 7,367,608 B2
(45) Date of Patent: May 6, 2008

(54) WIND STOP DEVICE

(75) Inventors: Bernd Rimmelspacher, Rheinstetten (DE); Matthias Goetz, Markgroeningen (DE); Joerg Riehle, Asperg (DE); Michael Fischer, Asperg (DE)

(73) Assignee: Scambia Industrial Developments Aktiengesellschaft, Schaan (LI)

( * ) Notice: Subject to any disclaimer, the term of this patent is extended or adjusted under 35 U.S.C. 154(b) by 0 days.

(21) Appl. No.: 11/192,338

(22) Filed: Jul. 27, 2005

(65) Prior Publication Data

US 2007/0040413 A1    Feb. 22, 2007

(30) Foreign Application Priority Data

Jul. 27, 2004    (DE)    .............. 10 2004 037 482

(51) Int. Cl.
- *B60J 7/22*    (2006.01)
- *B62D 35/00*    (2006.01)
- *B60J 1/20*    (2006.01)

(52) U.S. Cl. .................. 296/180.1; 296/85
(58) Field of Classification Search .............. 296/85, 296/180.1, 180.5; 49/333, 334, 335
See application file for complete search history.

(56) References Cited

U.S. PATENT DOCUMENTS

| | | | | |
|---|---|---|---|---|
| 2,219,825 A | | 10/1940 | Schonitzer | 16/307 |
| 2,338,965 A | * | 1/1944 | Parsons | 49/334 |
| 2,591,476 A | | 4/1952 | Swanson | 16/54 |
| 4,308,691 A | * | 1/1982 | Horn | 49/255 |
| 5,195,799 A | * | 3/1993 | Gotz et al. | 296/180.1 |
| 5,211,718 A | * | 5/1993 | Gotz et al. | 296/180.1 |
| 5,219,201 A | * | 6/1993 | Gotz et al. | 296/180.1 |
| 5,253,916 A | * | 10/1993 | Moore et al. | 296/180.5 |
| 5,318,337 A | * | 6/1994 | Gotz et al. | 296/180.5 |
| 5,738,404 A | * | 4/1998 | Stadler et al. | 296/180.1 |
| 5,765,905 A | * | 6/1998 | Hemmis et al. | 296/180.1 |
| 5,803,530 A | * | 9/1998 | Skrzypek et al. | 296/180.1 |
| 6,557,928 B2 | * | 5/2003 | Dreher et al. | 296/180.1 |
| 2002/0089214 A1 | * | 7/2002 | Gloss | 296/180.1 |
| 2002/0096911 A1 | * | 7/2002 | Maeurle et al. | 296/180.1 |
| 2003/0140451 A1 | | 7/2003 | Bivens et al. | 16/54 |
| 2006/0022488 A1 | * | 2/2006 | Kreis et al. | 296/180.1 |
| 2006/0208532 A1 | * | 9/2006 | Albrecht | 296/180.1 |

FOREIGN PATENT DOCUMENTS

DE    4018862 A1 *  1/1992    .................. 296/85

(Continued)

*Primary Examiner*—D. Glenn Gayoan
*Assistant Examiner*—Paul A Chenevert
(74) *Attorney, Agent, or Firm*—Lipsitz & McAllister, LLC

(57) ABSTRACT

In order, in the case of a wind stop device for motor vehicles, in particular, convertible vehicles, comprising a cover for a section of a passenger compartment opening of a vehicle body, this cover being arranged at the level of a belt line of the vehicle body, and a wind blocker which is connected to the cover via joints and which is pivotable from an inactive position resting on the cover into an active position raised above the belt line of the vehicle body, in which the wind blocker extends transversely to the cover, to increase the ease, with which a wind blocker of this type can be handled, it is suggested that a drive be provided, with which the wind blocker is movable at least from the inactive position into the active position.

39 Claims, 20 Drawing Sheets

FOREIGN PATENT DOCUMENTS

| | | | | |
|---|---|---|---|---|
| DE | 4119530 A1 * | 12/1992 | ............. | 296/180.1 |
| DE | 4315139 A1 * | 11/1993 | ................. | 296/85 |
| DE | 4315201 A1 * | 2/1994 | ............. | 296/180.1 |
| DE | 4235416 A1 * | 4/1994 | ............. | 296/180.1 |
| DE | 4311240 C1 * | 4/1994 | ............. | 296/180.1 |
| DE | 43 38 102 | 5/1995 | | |
| DE | 296 15 342 | 10/1996 | | |
| DE | 195 45 405 | 6/1997 | | |
| DE | 102 15 836 | 12/2003 | | |
| EP | 0 361 624 | 4/1990 | | |
| GB | 2182010 A * | 5/1987 | ................. | 296/15 |
| GB | 2 225 992 | 12/1988 | | |
| WO | 2004/028843 | 4/2004 | | |

\* cited by examiner

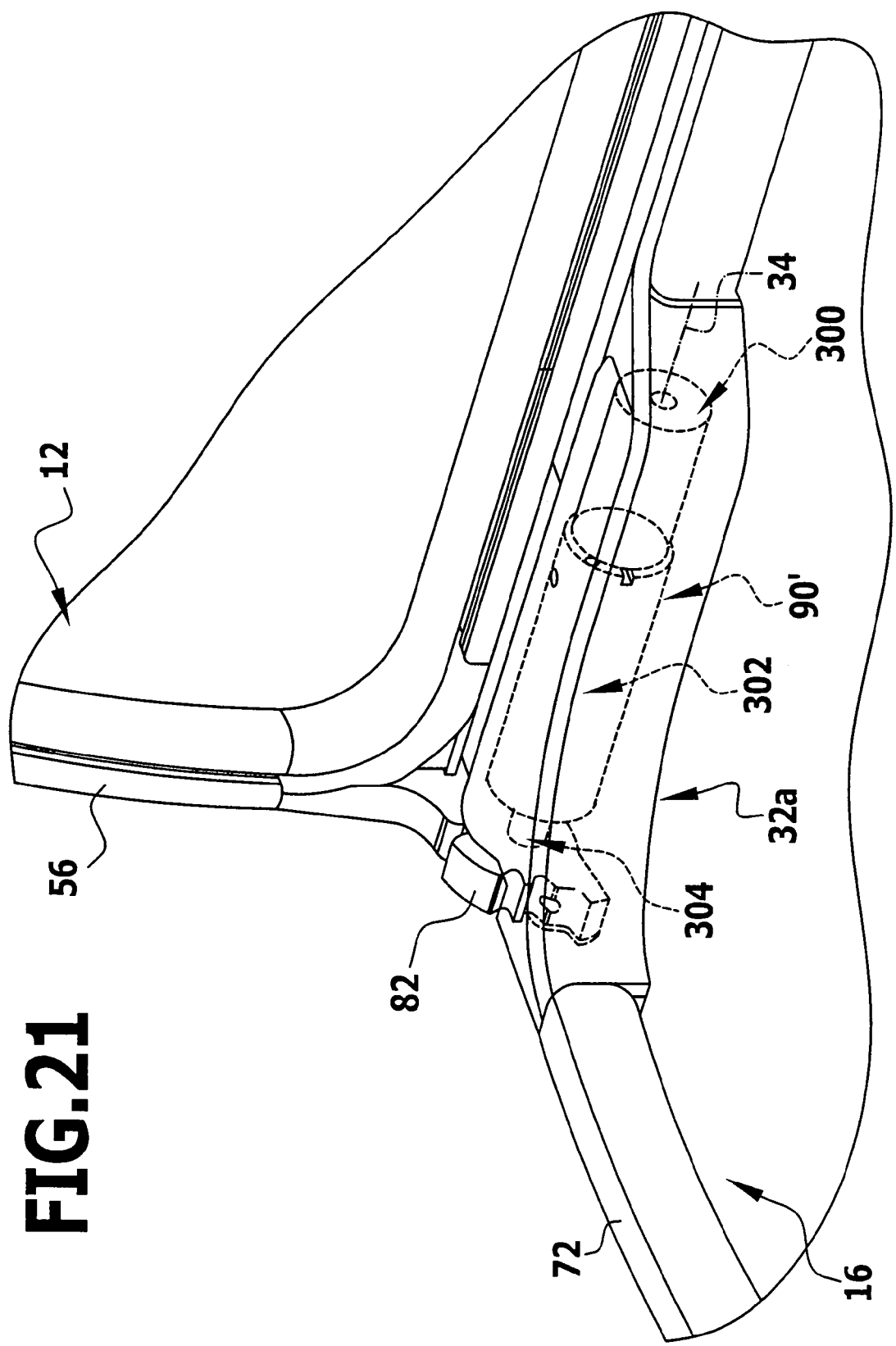

WIND STOP DEVICE

The present disclosure realtes to the subject matter disclosed in German applicaion number 10 2004 037 482.1 of Jul. 27, 2004, which is incorporated herein by reference in its entirety and in its entirety and for all purposes.

BACKGROUND OF THE INVENTION

The invention realtes to a wind stop device for motor vehicles, in particular, for convertible vehicles, comprising a cover for a section of a passenger compartment opening of a vehicle body, this cover being arranged at the level of a belt line of the vehicle body, and a wind blocker which is connected to the cover via joints and can be pivoted from an inactive position resting on the cover into an active position which is raised above the belt line of the vehicle body and in which the wind blocker extends transversely to the cover.

Wind stop devices of this type are known from the state of the art.

The problem with them is that the wind blocker should be as easy to handle as possible.

SUMMARY OF THE INVENTION

The object underlying the invention is therefore to increase the ease, with which a wind blocker of this type can be handled.

This object is accomplished in accordance with the invention, in a wind stop device of the generic type, in that a drive is provided, with which the wind blocker can be moved at least from the inactive position into the active position.

The advantage of the solution according to the invention is to be seen in the fact that an advantageous and convenient possibility exists with the drive of moving the wind blocker into the active position as required. In particular, this can also be possible while traveling without interrupting the journey.

With respect to the arrangement of the drive, the most varied of possibilities are conceivable. One advantageous solution, for example, provides for the drive to be arranged independently of the joint or joints.

A particularly expedient solution provides for the drive to be associated with at least one joint so that joint and drive can be combined from a spatial point of view.

It is even more advantageous when the drive is integrated into the joint so that drive and joint form a unit and the drive may, therefore, be incorporated into the constructional solution in a particularly advantageous manner.

A particularly expedient solution provides in this respect for the drive to be integrated into a bearing member of the joint.

With respect to the arrangement of the bearing member, the most varied of possibilities are conceivable.

One advantageous embodiment provides, for example, for the bearing member to be integrated into a wind blocker frame.

In this respect, it is particularly expedient when the bearing member is arranged in a corner area of the wind blocker frame.

Another advantageous solution provides for the bearing member to be integrated into the cover.

In this respect, the bearing member is preferably integrated into a cover part of the cover itself.

In this case, as well, the bearing member may be integrated particularly easily from an optical point of view when the bearing member is arranged in a corner area of the cover part, wherein this corner area is, in particular, a corner area of a frame of the cover part.

With respect to the design of the drive, the most varied of possibilities are conceivable.

One advantageous solution provides for the drive to comprise a spring elastic energy storing member, in which the energy can be stored for the pivoting of the wind blocker from the inactive position into the active position.

In this respect, the spring elastic energy storing member is expediently designed such that it has stored the maximum energy in the inactive position of the wind blocker.

Furthermore, it is expediently provided for the spring elastic energy storing member to have stored the minimum energy in the active position of the wind blocker.

The advantage that the energy storing member has still stored a minimum energy even in the active position of the wind blocker is to be seen in the fact that the spring elastic energy storing member can then be used to keep the wind blocker in the active position and to act on it with a force in the direction of the active position.

With respect to realizing the spring elastic energy storing member, the most varied of variations are conceivable.

For example, it would be conceivable to integrate the energy storing member into a wind blocker frame or a frame of the cover.

A solution which is of a particularly compact construction provides for the spring elastic energy storing member to comprise a torsion spring.

With a torsion spring of this type, large forces which can be used expediently for the pivoting movement of the wind blocker relative to the cover may be stored in a small space.

In this respect, it is particularly expedient when the torsion spring is arranged so as to be integrated in the joint so that a design construction is present which is particularly favorable from a spatial point of view.

With respect to safety, it is particularly favorable when the wind blocker is moved slowly from the inactive position into the active position driven by the drive.

In order to be able to realize such a movement which is as slow as possible with a spring elastic energy storing member, it is preferably provided for a damping element to be associated with the drive so that the movement of the wind blocker from the active into the inactive position can be carried out in a braked manner by means of the damping element.

Such a damping element may, in principle, be arranged completely independently of the drive.

It is, however, particularly expedient when the damping element is associated with at least one of the joints.

It is even more advantageous from a spatial point of view and also for the optical configuration when the damping element is integrated into the respective joint.

In principle, it would be conceivable to arrange the spring elastic force storing member in one joint and the damping element in the other joint.

However, in order to avoid torsion forces active via the wind blocker, it is preferably provided for the spring elastic energy storing member and the damping element to be associated with the same joint.

In order to keep the wind blocker in the inactive position, it is expedient, particularly in the case of a spring elastic energy storing member as drive, as well, when the wind blocker can be fixed in the inactive position in relation to the cover with a fixing device.

Such a fixing device has, first of all, in the case of a spring elastic energy storing member the advantage that the spring elastic force storing member may be tensioned and causes the energy to be stored during the transfer of the wind blocker from the active position into the inactive position and this energy can be stored at the spring elastic energy storing member as a result of the fixing device for such a time until a pivoting of the wind blocker from the inactive position into the active position is desired.

In addition, such a fixing device is, however, in any case of advantage since it creates the possibility of fixing the wind blocker securely in the inactive position and against any unexpected movements.

In this respect, it is particularly expedient when the fixing device comprises a blocking element which transfers automatically into a blocking position and can be transferred manually into a release position.

With such a blocking element, the functions of the fixing device required in accordance with the invention may be realized in a particularly simple and inexpensive manner.

The fixing device may be arranged at the most varied of locations on the vehicle body and the wind stop device.

One possibility provides for the fixing device to be arranged on the vehicle body and act on the wind blocker—for example, by means of a locking element.

Another advantageous solution provides for the fixing device to be arranged on the cover or the wind blocker and, therefore, for the cover and the wind blocker to be fixable relative to one another.

In this respect, it is conceivable to arrange the fixing device in a central area of the wind blocker and the cover.

Another advantageous possibility provides for the fixing device to be arranged in the area of at least one of the joints.

A particularly favorable embodiment provides for the fixing device to be arranged on the cover.

Particularly when the cover consists of several cover parts, it is preferably provided for the fixing device to be arranged on one of the cover parts.

In order to be able to actuate the fixing device expediently, it is provided, in addition, for the fixing device to be actuatable by an actuating device in the sense of releasing the fixing in position.

Such an actuating device can, in principle, be arranged close to the fixing device, for example, also on the same cover part.

A solution is, however, particularly expedient, in which the actuating device is arranged on the respectively other cover part.

As a result, it is possible in a particularly advantageous manner to separate the actuating device and the fixing device when the wind stop device is transferred into its folded state.

For example, one favorable solution provides for the fixing device to be actuatable by the actuating device in the sense of a release thereof beyond the plane of separation in an unfolded state of the cover.

In this respect, it is favorable when the fixing device is no longer actuatable after the completely unfolded state of the cover has been left.

This may be realized in a constructionally simple manner in that the actuating device has an actuating head, with which the fixing device can be acted upon by it engaging beyond the plane of separation.

In this respect, it is particularly favorable when the actuating head is at such a distance from the fixing device after the completely unfolded state of the cover has been left that the fixing device is no longer actuatable.

In order to be able to actuate the actuating device in an ergonomically favorable manner, it is provided in one advantageous embodiment for the actuating device to have an actuating lever which is arranged on the driver's side of the cover such that a transfer of the wind blocker from the inactive position into the active position can be brought about in a simple manner by the driver of the motor vehicle.

In a further, advantageous solution it is provided for the fixing device to be designed such that the fixing device transfers into a blocking position during movement of the wind blocker in a pivot-in direction in the direction of its inactive position.

This means that the fixing device need not, of necessity, be designed such that it transfers into the blocking position independently prior to the wind blocker pivoting into the inactive position but rather that the transfer of the fixing device from a release position into the blocking position can be brought about, for example, during the pivoting of the wind blocker into the inactive position.

Furthermore, it is preferably provided for the fixing device located in the blocking position to transfer into a release position due to movement of the wind blocker in the pivot-in direction and subsequent movement of the wind blocker in a pivot-out direction.

This solution provides, for example, the possibility of acting on the wind blocker in its inactive position in the direction of the pivot-in movement and, therefore, of moving it in this direction beyond the inactive position, whereby a transfer of the fixing device from its blocking position into its release position is initiated so that the wind blocker can transfer automatically into the active position from the inactive position driven by the drive.

In this respect, it is particularly favorable when the fixing device is designed as a catch device, in which a catching element can be secured.

In this case, it is provided, in particular, for the fixing device to comprise a catch slide which can be moved between a release position moved out of the catch slide housing in the pivot-out direction and a blocking position moved into the catch slide housing in the pivot-in direction.

In this respect, the catch slide is preferably designed such that it comprises a guide member and a catcher element which is connected to it so as to be movable and is located in a position securing the catching element in the blocking position and in a position releasing the catching element in the release position.

The catcher element can be moved, for example, transversely to the pivot-in direction and pivot-out direction, in particular, towards the guide element and away from it, wherein this movability serves to secure and release the catching element.

Furthermore, the catch slide is preferably acted upon by an elastic element, for example, a spring so that it always has the tendency to move in the direction of its release position.

A particularly advantageous variation of this embodiment according to the invention provides for the catch slide to be movable between the blocking position and the release position due to action of the catching element.

With respect to the drive, the spring elastic energy storing member has been explained first of all in conjunction with the preceding explanations concerning the individual embodiments.

Alternatively thereto, an additional, preferred embodiment provides for the drive to be designed as an electric drive.

As a result, the movements of the wind blocker can be controlled, for example, by the driver whilst traveling and so the wind blocker can be moved back and forth between the active and the inactive position without stopping.

Such an electric drive comprises, in the simplest case, an electric drive motor.

In order, however, to be able to carry out a reliable and, therefore, slow pivoting movement of the wind blocker relative to the cover, it is preferably provided for the drive to comprise a gear driven by the electric drive motor, wherein the gear sees to it at least that as high a torque as possible is obtained during the pivoting of the wind blocker relative to the cover.

A gear does, however, also create the possibility, on account of its self-locking, of securing the wind blocker in the position which it has reached due to the gear being driven by the electric motor.

In this respect, it is possible to pivot the wind blocker not only either into the active or the inactive position.

On the contrary, such an electric drive with a gear offers the possibility of pivoting the wind blocker into all the intermediate positions between the inactive and the active position so that an optimum adjustment of the position of the wind blocker can be achieved which sees to it that the air currents which are annoying for a driver or passenger or annoying draft phenomena and/or annoying noises due to the wind during travel do not occur but a constant exchange of air which is pleasant for driver and passenger takes place.

Furthermore, it is particularly expedient when the gear is designed as a self-locking gear so that fixing devices are no longer necessary and the gear always remains in the position, into which it has been moved by the electric motor.

Additional features and advantages of the invention are the subject matter of the following description as well as the drawings illustrating several embodiments.

BRIEF DESCRIPTION OF THE DRAWINGS

FIG. 20 shows an enlarged illustration of a guide member of the catch device with its guide path and FIG. 21 shows a section similar to FIG. 5 through a seventh embodiment.

DETAILED DESCRIPTION

Figure 1:
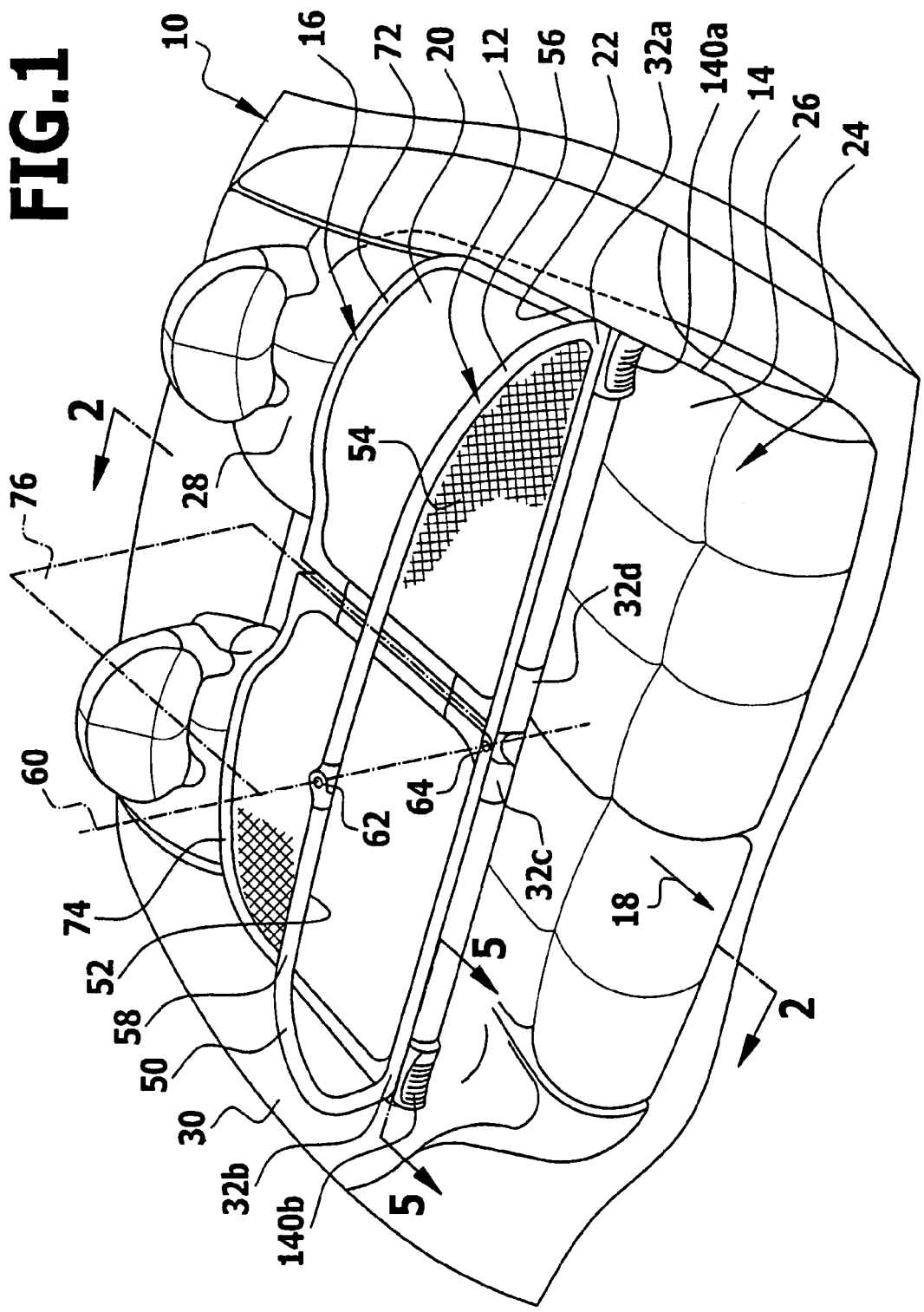
FIG. 1 shows a perspective view of a first embodiment of a wind stop device according to the invention in an active position of the wind blocker.

A first embodiment illustrated in FIG. 1 of a wind stop device for a motor vehicle, in particular, for a convertible vehicle, the vehicle body 10 of which is illustrated in a sectional manner in FIG. 1, comprises a wind blocker 12 which, in its active position illustrated in FIG. 1, projects upwards beyond a belt line 14 of the vehicle body 10 of the motor vehicle as well as a cover 16 which, in relation to a direction of travel 18, covers a section 20 of a passenger compartment opening 22 arranged approximately at the level of the belt line 14, this section being located behind the wind blocker 12 in its active position. For example, the section 20 of the passenger compartment opening 22 is located above a rear seat system 24 which has a bench seat 26 as well as a seat back 28.

In this respect, the section 20 of the passenger compartment opening 22 is preferably directly adjacent to the seat back 28 and extends in the direction of travel 18 as far as the wind blocker 12, likewise with connection to side walls 30 of the vehicle body in the area of the belt line 14.

In this respect, the wind blocker 12 is expediently seated in its active position such that it is arranged essentially directly behind head restraints of front seats of the motor vehicle which are not illustrated in the drawing of FIG. 1.

Figure 2:
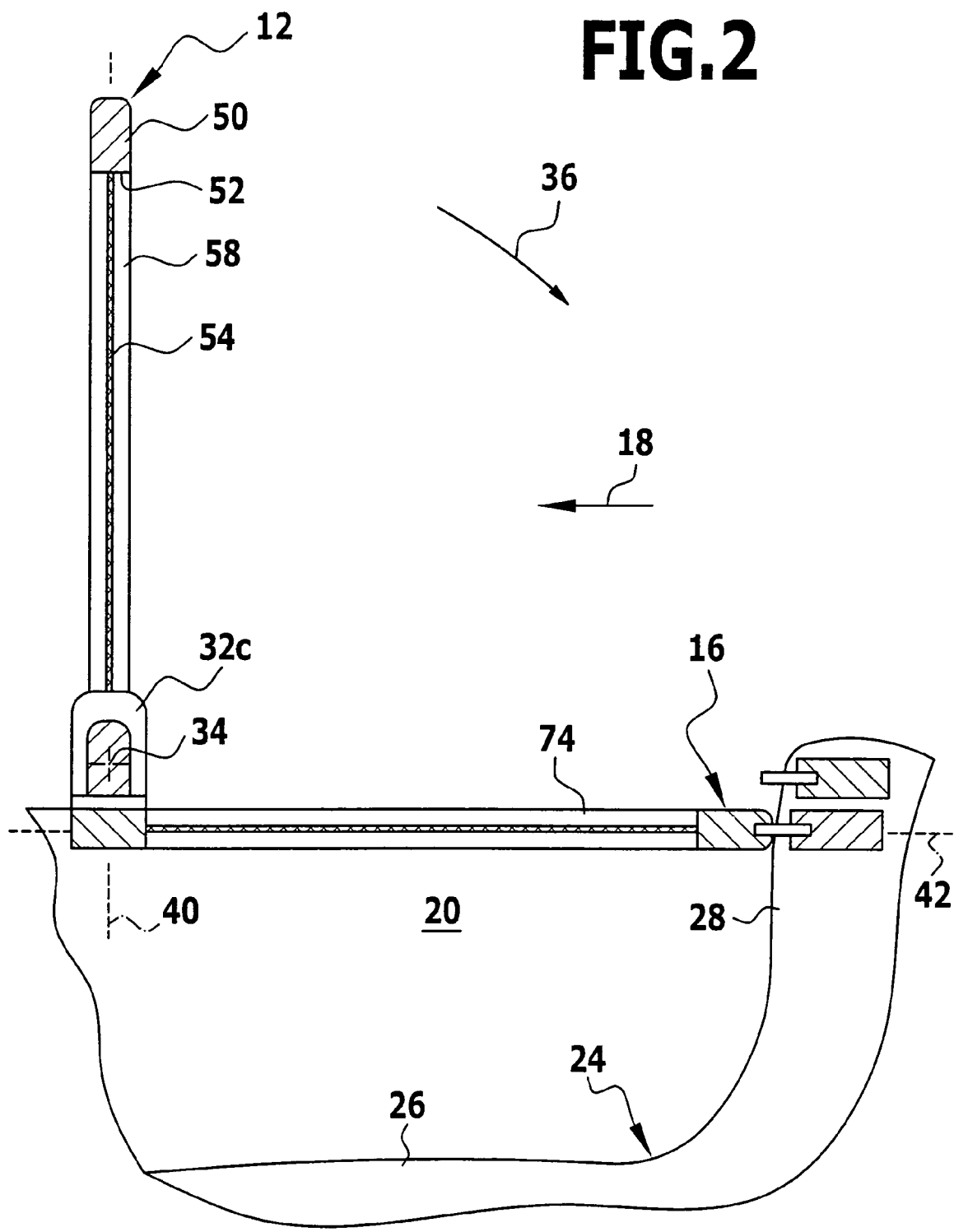
FIG. 2 shows a section along line 2-2 in FIG. 1.
Figure 3:
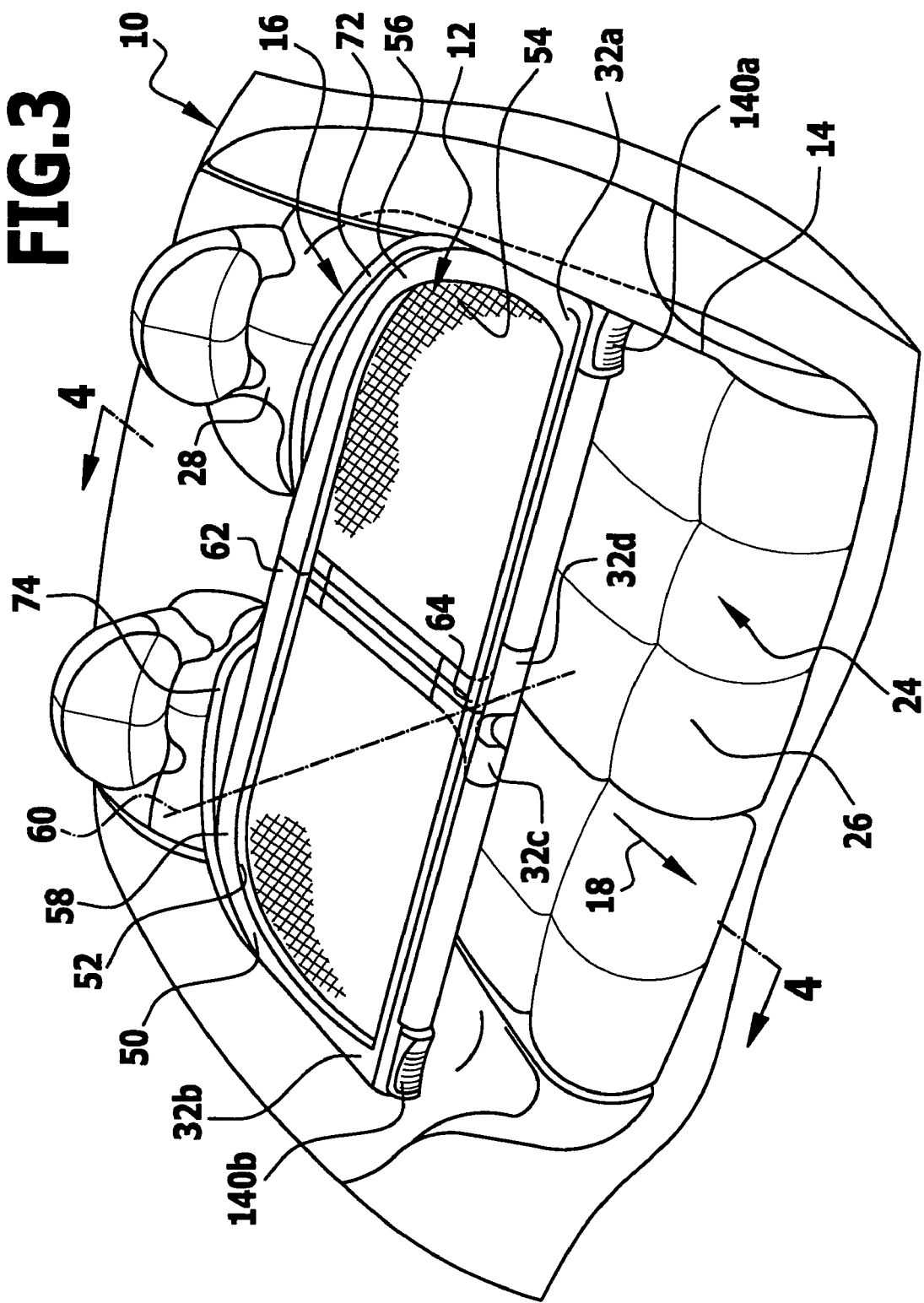
FIG. 3 shows a perspective illustration similar to FIG. 1 in an inactive position of the wind blocker.
Figure 4:
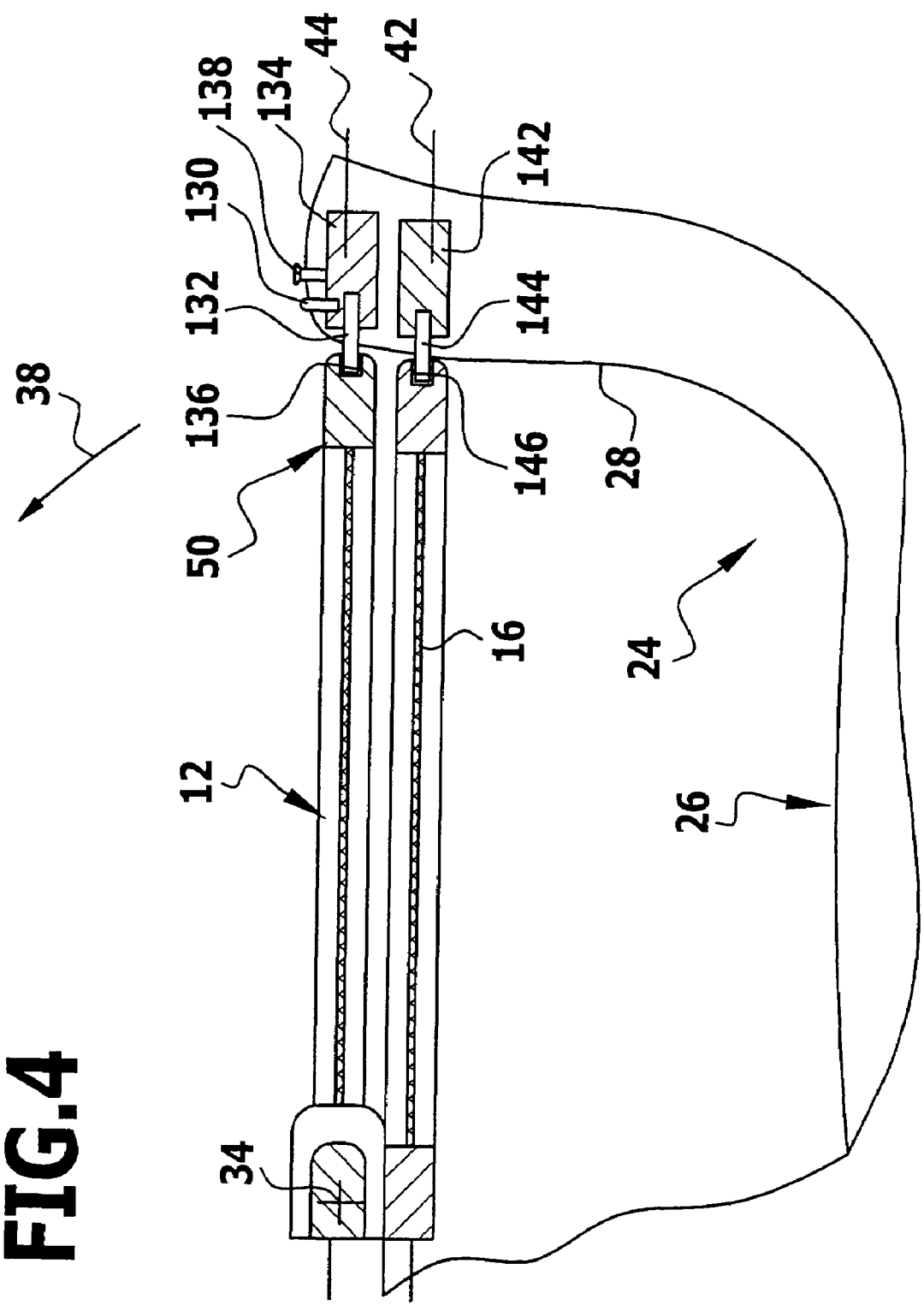
FIG. 4 shows a section along line 4-4 in FIG. 3.

The cover 16 is connected to the wind blocker 12 via joints 32, preferably via the joints 32a, b, c, d, so as to pivot about an axis 34, illustrated in FIG. 2, such that the wind blocker 12 can be pivoted from the active position illustrated in FIGS. 1 and 2 due to pivoting about the axis 34 in a pivoting direction 36 into an inactive position which is illustrated in FIGS. 3 and 4 and in which the wind blocker 12 extends essentially parallel to the cover 16 and is arranged so as to essentially rest on it.

The wind blocker 12 may again be moved from this inactive position as a result of pivoting in a pivoting direction 38 about the axis 34 into the active position again which is illustrated in FIGS. 1 and 2 and in which the wind blocker 12 extends in a plane 40 which runs transversely to a plane 42, in which the cover 16 extends.

In the active position of the wind blocker 12, the plane 40 preferably forms with the plane 42 an angle of between approximately 60° and approximately 120°, preferably an angle of between approximately 70° and approximately 110°.

On the other hand, the wind blocker 12 extends in the inactive position, illustrated in FIG. 3, in a plane 44 which runs approximately parallel to the plane 42.

The wind blocker 12 has, as illustrated, in particular, in FIG. 1 and FIG. 3, a wind blocker frame 50 which encloses a frame opening 52 which is closed by a wind blocker frame insert 54, wherein the wind blocker frame insert 54 is designed to be permeable to air but to obstruct wind, i.e., such that it blocks a fast current of air.

The wind blocker frame 50 can, in this respect, be designed in one piece. It is, however, also conceivable to form the wind blocker frame 50, as illustrated in FIGS. 1 and 3, from two frame parts 56 and 58 which are pivotable relative to one another about a pivot axis 60 which represents, for example, the central axis of the wind blocker frame 50.

In their unfolded functional position, the two frame parts 56 and 58 extend with a maximum extension transversely to the direction of travel 18 in the plane 40 or 44 so that the two frame parts 56 and 58 also keep the wind blocker frame insert 54 tensioned in the plane 40 or 44.

The frame parts 56 and 58 are preferably designed such that they are connected to one another via hinges 62 and 64 and each extend in a C shape on either side of the pivot axis 60 so that in the functional position the frame opening 52 is enclosed altogether by the C-shaped frame parts 56 and 58 and is, therefore, not divided by struts, in particular, in the area of the pivot axis 60.

The cover 16 is likewise formed from two cover parts 72, 74 which are separated from one another in the area of a plane of separation 76, in which the pivot axis 60 is also located.

The two cover parts 72 and 74 are respectively connected to the wind blocker frame 50 via the joints 32a and 32b.

Figure 5:
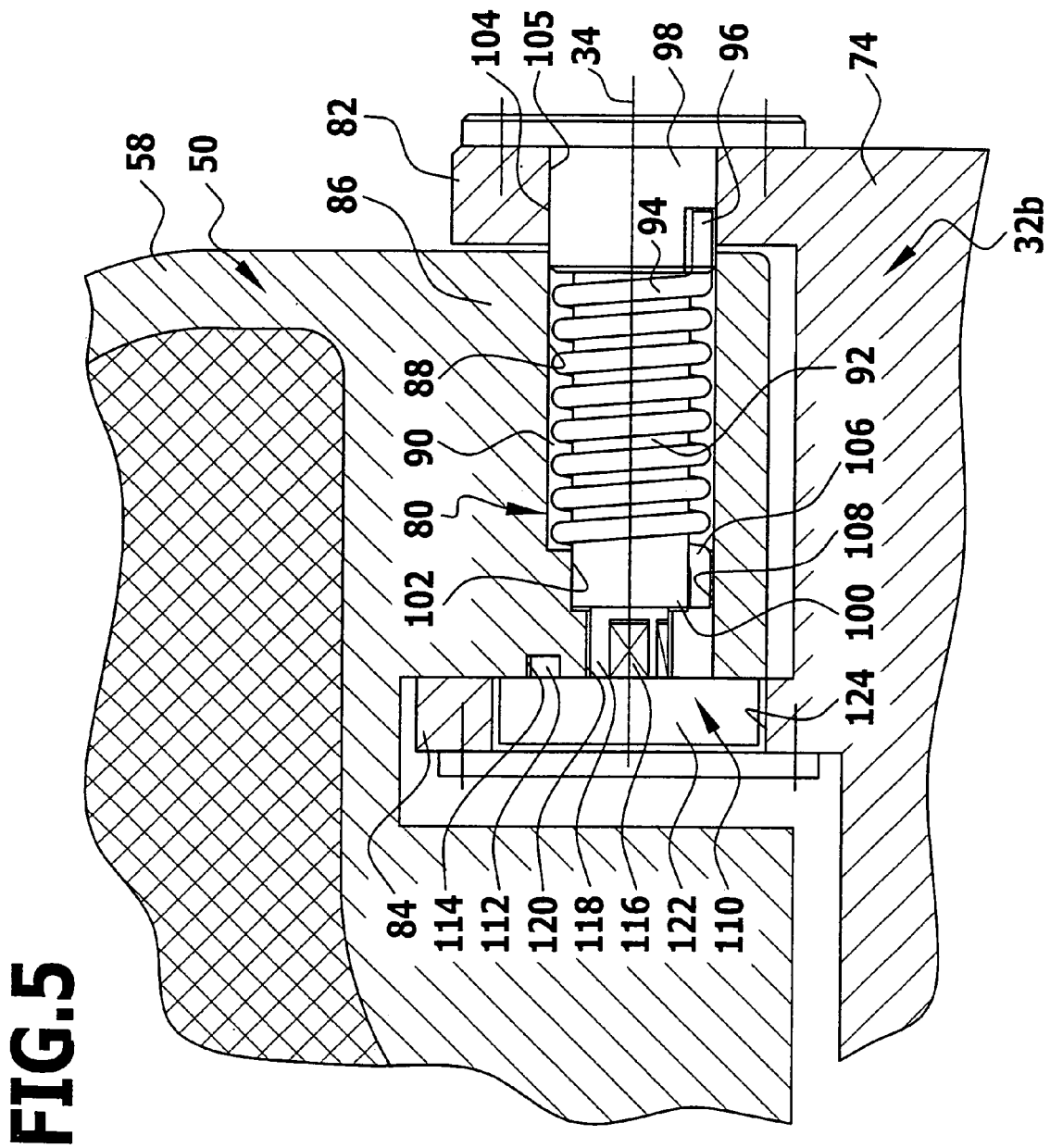
FIG. 5 shows a section along line 5-5 in FIG. 1 through a joint with integrated drive in the first embodiment.

One of the joints 32a, b has, as illustrated in FIG. 5, a bearing member 80 which is arranged, for example, on the wind blocker frame 50 and is, in particular, integrally formed in it in a corner area 86 and two bearing flanges 82 and 84 which are arranged, for example, on the respective cover part 72, 74.

Furthermore, a drive designated as a whole as 90 is provided in a recess 88 of the bearing member 80 and serves the purpose of pivoting the wind blocker 12 automatically from the inactive position into the active position.

The drive 90 comprises, in this respect, a torsion spring 94 which extends in a spiral shape around a bearing journal 92 and is anchored in a head 98 of the bearing journal with a first end 96 so as to be non-rotatable, wherein the head 98 is, for its part, accommodated in the bearing flange 82 so as to be non-rotatable, namely such that a central axis of the bearing journal 92 extends coaxially to the axis 34, about which the wind blocker 12 is intended to be pivotable relative to the cover 16.

The bearing journal 92 extends from its head 98 as far as a bearing section 100 which is mounted in a recess 102 of the bearing member 80 so as to be rotatable so that the bearing member 80 and the recess 102 can rotate about the bearing journal 92 which is rigidly connected to the bearing flange 82.

Moreover, the head 98 extends with a cylindrical casing surface 104 through an opening 105 of the bearing flange 82 and, due to the fact that its cylindrical casing surface 104 engages in the recess 88 of the bearing member 80, forms with this casing surface a rotary mounting for the bearing member 80 relative to the head 98 of the bearing journal 92 rigidly connected to the bearing flange 82.

Furthermore, the torsion spring 94 which extends in a spiral shape around the bearing journal 92 is anchored securely in the bearing member 80, for example, a recess 108 thereof with a second end 106.

The torsion spring 94 is designed such that it is tensioned in the inactive position of the wind blocker 12, i.e., stores energy which can be used for the purpose of moving the wind blocker 12 from the inactive position into the active position, wherein the torsion spring 94 does, however, preferably have such a strong initial tensioning in the active position of the wind blocker 12 that the torsion spring 94 is in a position to keep the wind blocker 12 in the active position.

The energy required to pivot the wind blocker 12 from the inactive into the active position is brought about in that the tensioned torsion spring 94 acts on the bearing member 80, namely with the second end 106 via the recess 108, as a result of the first end 96 being secured relative to the bearing flange 82 and, therefore, relative to the cover part 74 in such a manner that the bearing member 80 is pivoted relative to the bearing flanges 82 and 84, namely in the sense that the wind blocker 12 is raised from the inactive position into the active position. The wind blocker 12 is then held in the active position, for example, by the torsion spring 94.

In order to have this pivoting movement caused by the torsion spring 94 brought about in a damped manner, a damping element 110 is associated with the drive 90, in addition, and this is connected in a form-locking manner and, therefore, non-rotatably to the bearing member 80 via a form-locking element 112 which engages in a recess 114 in the bearing member 80.

This damping element 110 has a drive shaft 116 which engages in a form-locking manner in an end section 118 of the bearing journal 92 adjoining the bearing section 100 and is connected to it non-rotatably. The end section 118 of the bearing journal 92 passes through an opening 120 of the bearing member 80 which extends between the recess 102 and the damping element 110 which is preferably mounted so as to be rotatable with a housing 122 in a recess 124 in the bearing flange 84 so that a further mounting of the bearing member 80 is brought about via the bearing flange 84 via the housing 122 which is connected to the bearing member 80 so as to be non-rotatable and radially non-displaceable via the form-locking element 112 and the recess 114.

As a result of the fact that the housing 122 of the damping element 110 turns with the bearing member 80 while the drive shaft 116 is, finally, connected to the bearing journal 92 so as to be non-rotatable and is, therefore, coupled non-rotatably to the bearing flange 82, the damping element 110 can cause a braking of the pivoting movement of the bearing member 80 relative to the bearing flanges 82, 84, for example, due to friction and, therefore, generate a slow and gentle pivoting movement of the wind blocker 12 relative to the cover 16 so that any risk of injury to persons is precluded and, on the other hand, a strong impact of the wind blocker 12 is avoided when this abuts on stops, which define the active position and are not illustrated in the drawings and on which the torsion spring 94 abuts the wind blocker 12, i.e., in particular, the wind blocker frame 50 in the active position and keeps it in abutment in order to maintain the active position of the wind blocker 12 automatically.

In order to be able to fix the wind blocker 12 in its inactive position, in which the torsion spring 94 is tensioned to its maximum, a fixing device 130 is provided, for example, on the vehicle body 10, preferably in continuation of the seat back 28, as illustrated in FIG. 4, the wind blocker 12 being securable in its inactive position with this fixing device.

The fixing device 130 comprises, for example, as blocking element a safety bolt 132 which is guided so as to be movable in a bolt housing 134, which is held on the vehicle body 10, and is in a position to engage in a bolt receiving means 136 in the wind blocker frame 50 and, therefore, to secure the wind blocker frame 50 in the inactive position with a tensioned torsion spring 94.

For example, the safety bolt 132 may be moved out of the bolt receiving means 136 when an actuating element 138 is actuated.

In this case, the wind blocker 12 is freely movable and can move, driven by the torsion spring 94, in the pivot direction 38 from the inactive position into the active position.

Furthermore, the entire wind stop device can also preferably be fixed to the vehicle body 10 in that, as illustrated in FIGS. 1 and 3, the cover parts 72 and 74 have retaining devices 140a, 140b which serve the purpose of anchoring the cover parts 72 and 74 in the vehicle body 10.

For example, the retaining devices 140a, 140b engage with a retaining pin in an opening of the vehicle body 10 not illustrated in the drawings.

In addition, the cover parts 72 and 74 are anchored to the vehicle body 10 in the area of the seat back 28 with retaining devices 142, wherein the retaining device 142 has, for example, a retaining pin 144 which engages in a recess 146 in the cover part 72 or 74 and likewise secures this in the area of the seat back 28 in addition to the retaining devices 140a, 140b.

Figure 6:
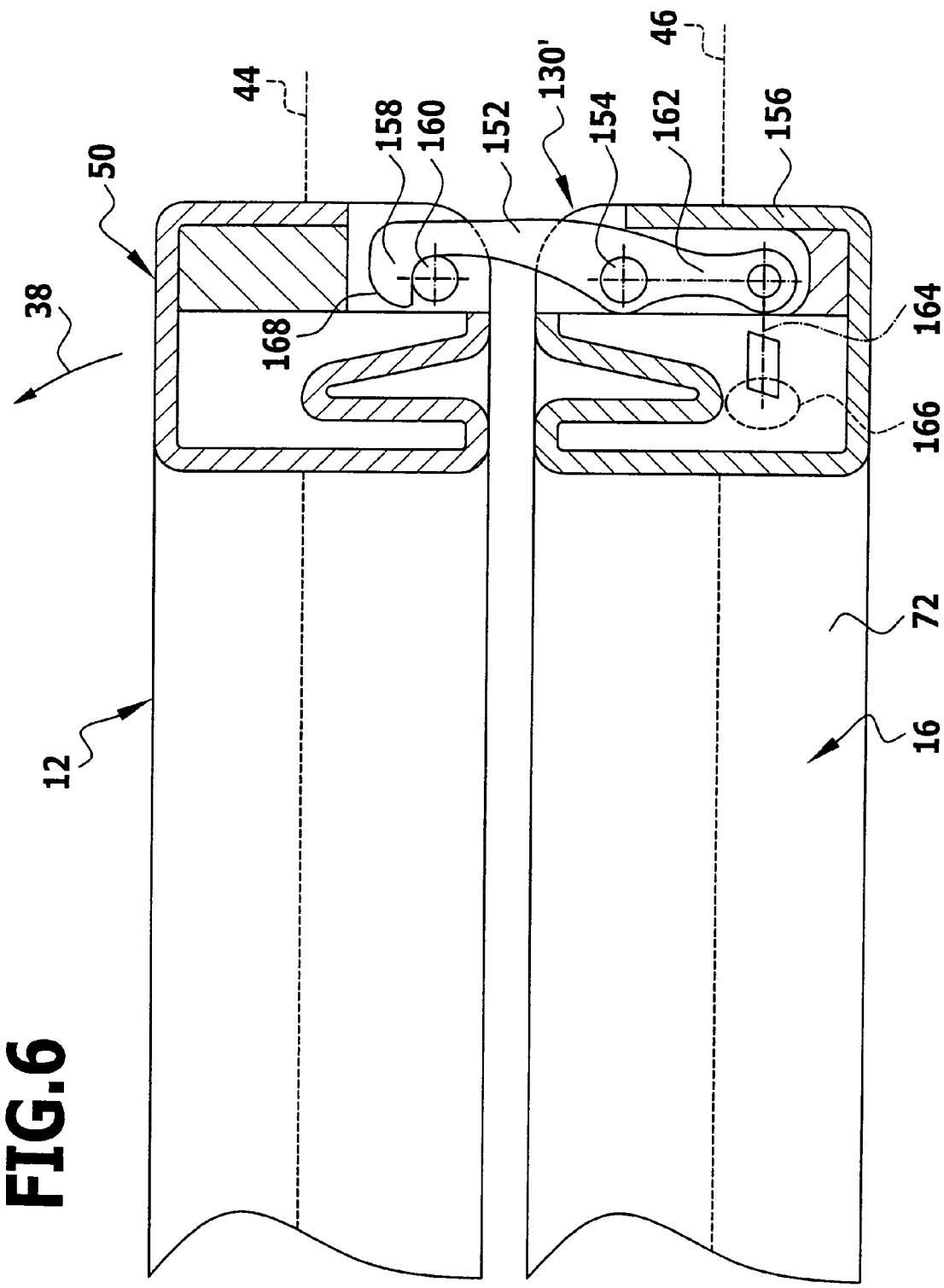
FIG. 6 shows a section similar to FIG. 4 in a second embodiment of a wind stop device according to the invention.

In a second embodiment of a wind stop device, illustrated in FIG. 6, those parts which are identical to those of the first embodiment are given the same reference numerals and so reference can be made in full to the comments on the first embodiment.

In the second embodiment illustrated in FIG. 6, the wind blocker frame 50 of the wind blocker 12 is held relative to the respective cover part 72 by a fixing device 130' modified in comparison with the first embodiment.

This fixing device 130' comprises as blocking element a pivotable locking element 152 which is held in a frame 156 of the cover part 72 so as to be pivotable about an axis 154.

This pivotable locking element 152 comprises, in addition, a locking element nose 158 in order to engage behind a locking element receiving means 160 designed, for example, as a bolt insofar as the pivotable locking element 152 is in its locking position.

In addition, the pivotable locking element 152 comprises on a side of the axis 154 located opposite the locking element nose 158 an actuating arm 162 which can be acted upon, for example, by means of a pulling element 164, for example, a cable line in order to bring the locking element nose 158 out of engagement with the locking element receiving means 160, namely by pivoting the pivotable locking element 152 about the axis 154.

The pulling element 164 is guided, for example, in the frame 156 of the respective cover part 72, 74 to an actuating element 166, via which the pulling element 164 can be acted upon manually with traction in order to bring the locking element nose 158 out of engagement with the locking element receiving means 160 and, therefore, to allow a free movement of the wind blocker 12 from the inactive position illustrated in FIG. 6 into its active position, as has already been described in conjunction with the preceding embodiments.

In addition, the locking element nose comprises an inclined abutting surface 168 which results in the locking element receiving means 160, which acts on this inclined abutting surface 168, pivoting the pivotable locking element 152 about the axis 154 out of its locking position during the pivoting of the wind blocker 12 into the inactive position so that the locking element receiving means 160 can be moved past the locking element nose 158 to such an extent until this engages behind the locking element receiving means 160 and, therefore, secures the wind blocker 12 against any pivoting movement in the pivoting direction 38.

Figure 7:
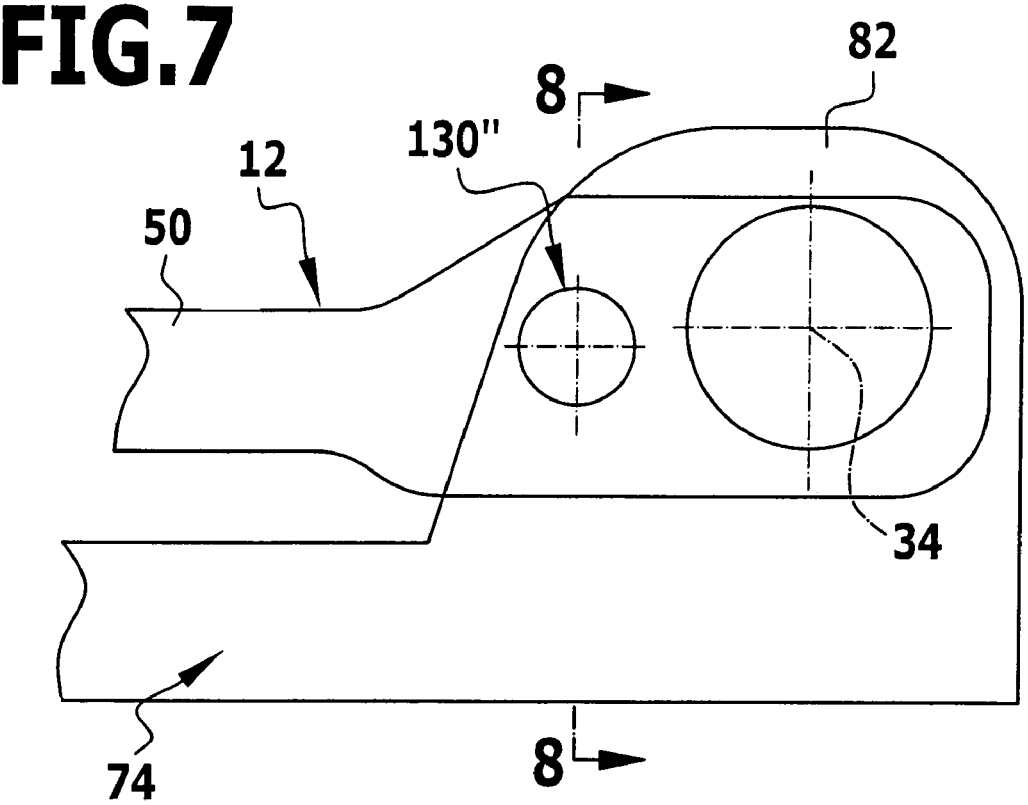
FIG. 7 shows a side view of a third embodiment of a wind stop device according to the invention in the area of one of the joints.
Figure 8:
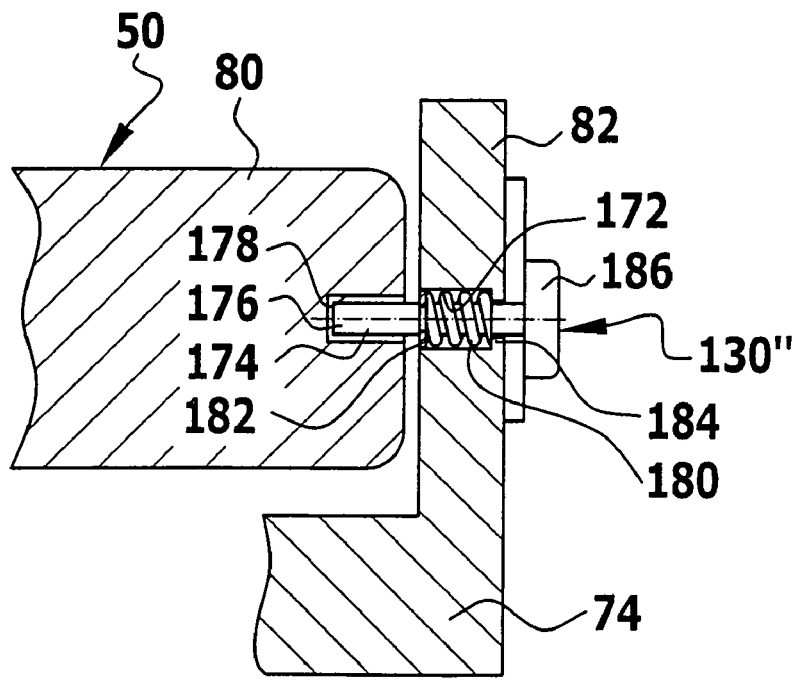
FIG. 8 shows a section along line 8-8 in FIG. 7.

In a third embodiment of a wind stop device according to the invention, as illustrated in FIG. 7 and FIG. 8, a further variation 130" of a fixing device is provided.

In the third embodiment, the bearing flange 82 is of an enlarged design so that the fixing device 130" can be provided in it.

For this purpose, a receiving bore 172, in which a pulling locking element 174 is guided as blocking element, is provided in the bearing flange 82, wherein the pulling locking element is arranged at approximately the same distance from the cover element 74 as the axis 34.

The pulling locking element 174 is designed such that it passes through the receiving bore 172 and is in a position to dip with an end 176 into a pulling locking element receiving means 178, provided approximately in the bearing member 80 of the wind blocker frame 50.

The pulling locking element 174 is, in addition, acted upon in the direction of its locking position by a spring 180, wherein the spring 180 acts on a shoulder 182 provided on the pulling locking element 174 while it is supported, on the other hand, on a guide flange 184 of the receiving bore 172 which guides the pulling locking element 174.

Furthermore, the pulling locking element 174 is provided with an actuating head 186 which can be gripped by an operator in order to move the pulling locking element 174 with its end 176 out of the pulling locking element receiving means 178 and, therefore, to give the wind blocker 12 the freedom to move into the active position due to the action of the torsion spring 94.

The same reference numerals as in the first embodiment are used in both the second and the third embodiments for the same parts of the wind stop device and so with respect to all the variations not described in detail for the second and third embodiments reference is made in full to the comments on the first embodiment.

Figure 9:
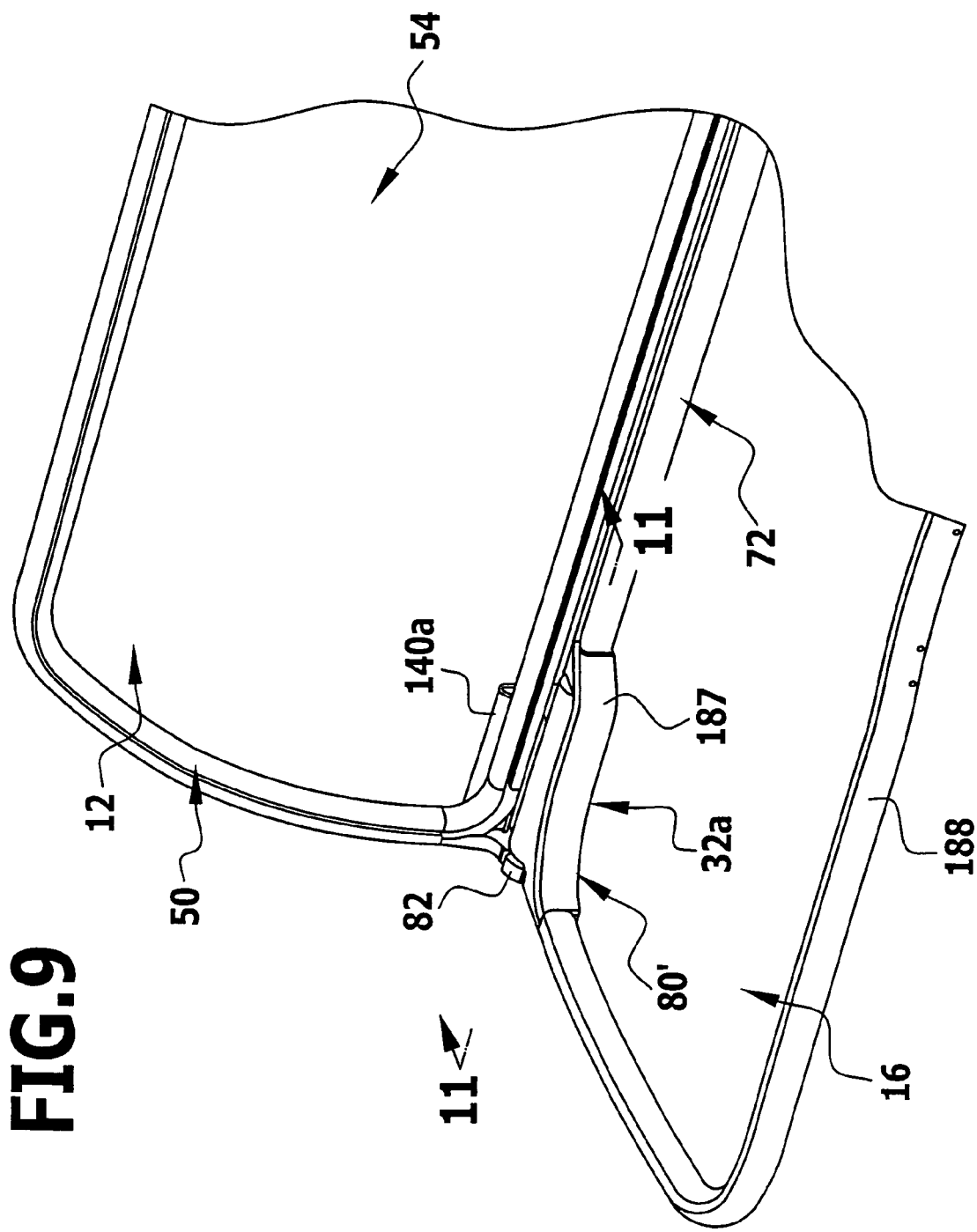
FIG. 9 shows a perspective partial view of a fourth embodiment of a wind stop device according to the invention.
Figure 10:
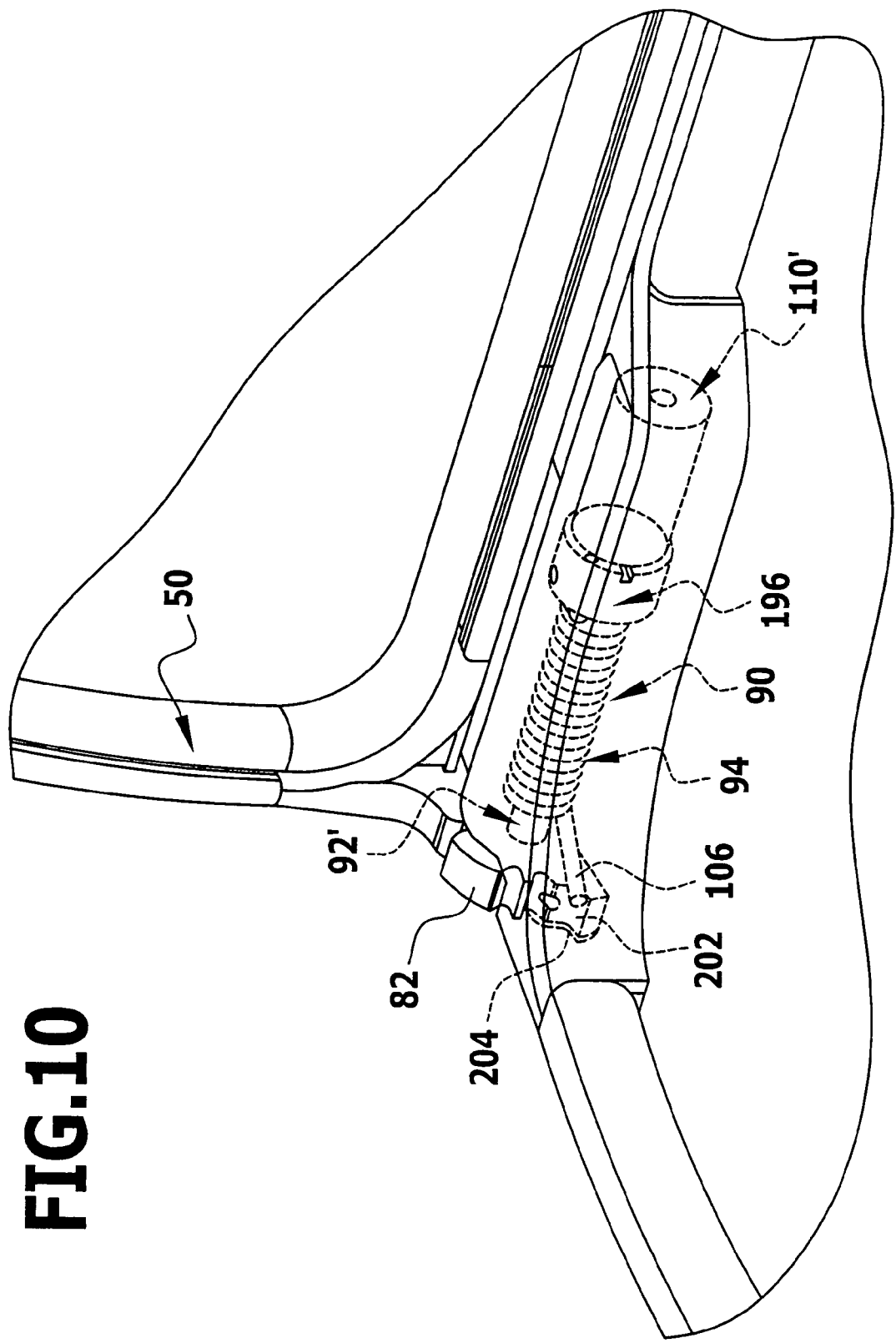
FIG. 10 shows an enlarged illustration of a joint between wind blocker and cover with a drive and a bearing member in a see-through illustration.
Figure 11:
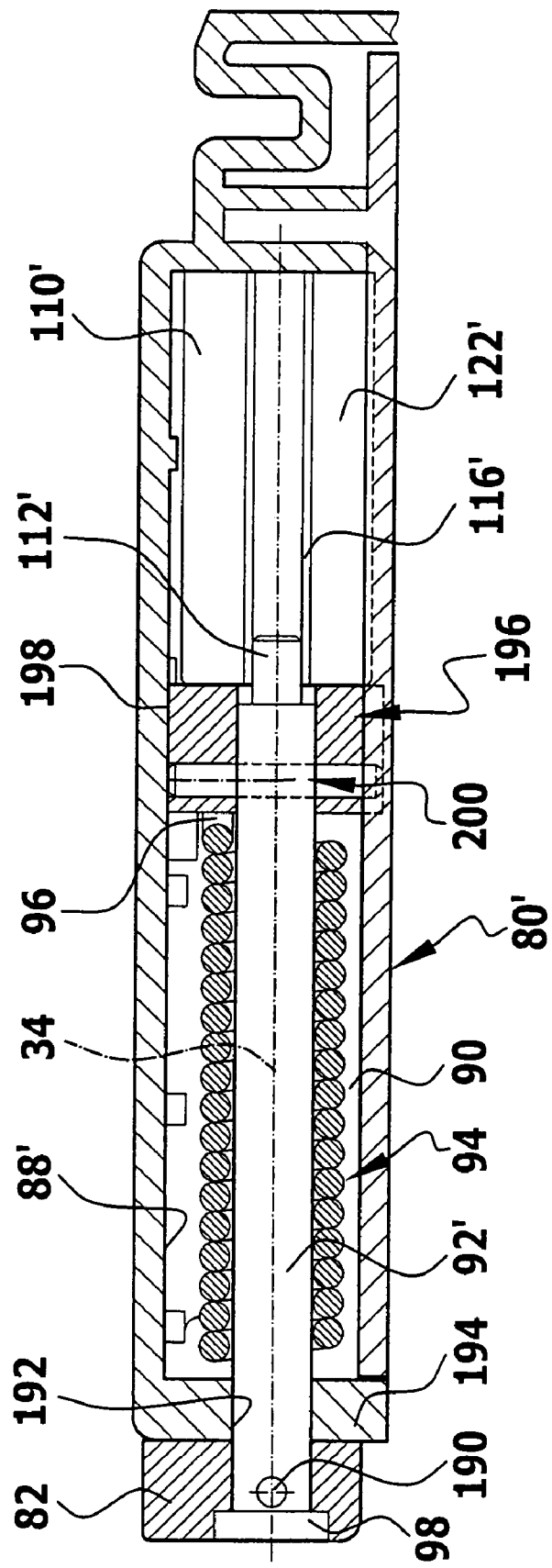
FIG. 11 shows a section along line 11-11 in FIG. 9.

In a fourth embodiment, illustrated in FIGS. 9 to 11, those parts which are identical to the corresponding parts of the preceding embodiments are given the same reference numerals and so reference is made in full to the comments on the preceding embodiments with respect to their description.

In contrast to the preceding embodiments, the bearing member 80' is held on one of the cover parts 72, in particular, integrated in a corner area 187 of a frame 188 of the respective cover part and interacts with a bearing flange 82 which is arranged on the wind blocker frame 50, as illustrated in FIGS. 10 and 11.

In the same way as in the first embodiment, the bearing flange 82 is connected to the head 98 of the bearing journal 92 so as to be non-rotatable, for example, by means of a pin 190 passing through the head 98 and the bearing flange 82.

The bearing journal 92 is mounted immediately next to the bearing flange 82 in an opening 192 of a side wall 194 of the bearing housing 80' and passes through the recess 88' in the bearing member 80' as far as a connecting piece 196 which is mounted, for its part, in the recess 88' in the bearing member 80' so as to be rotatable, namely as a result of a rotatable mounting of its casing surface 198.

The connecting piece 196 is likewise connected to the bearing journal 92' so as to be non-rotatable, for example, via a pin 200 and serves to accommodate the first end 96 of the torsion spring 94 while the second end 106 of the torsion spring is secured in the bearing member 80', as illustrated in FIG. 10.

In addition, the bearing journal 92' is connected by means of the form-locking element 112' to the drive shaft 116 of the damping element 110', the housing 122' of which is accommodated in a non-rotatable manner within the bearing member 80' in the recess 88' on a side of the connecting piece 196 located opposite the torsion spring 94. It is, however, also conceivable to connect the drive shaft 116' non-rotatably to the connecting piece 196.

The pivoting of the wind blocker 12 from the active position into the inactive position results, therefore, in a pivoting of the bearing flange 82 and with it a turning of the bearing journal 92' about the axis 34, whereby torsion acts via the connecting piece 196 on the first end 96 of the torsion spring 94 which is mounted with its second end 106 in the bearing member 80' so as to be non-rotatable.

As a result, energy required for moving the wind blocker 12 upright is stored in the torsion spring 94.

At the same time, the drive shaft 116' of the damping element 110' is turned which does not have any substantial effect during the transfer of the wind blocker 12 from the active position into the inactive position.

The wind blocker 12 can be fixed in the inactive position in any optional manner, for example, in accordance with one of the embodiments 1 to 3.

After release of the fixing device 130, the energy stored in the torsion spring 94 causes the first end 96 to act on the connecting piece 196 and, therefore, to turn the bearing journal 92' which, for its part, acts on the bearing flange 82 and, therefore, pivots the wind blocker 12 about the axis 34.

The rotary movement caused by the torsion spring 94 is damped by the damping element 110' which is turned as well on account of the connection between the form-locking element 112' and the drive shaft 116'.

As a result of this damping element 110', a slow pivoting movement of the wind blocker 12 from the inactive position into the active position takes place, i.e., the wind blocker 12 moves itself upwards from the inactive position into the active position for such a time until a stop element 202 provided on the bearing flange 82 comes to rest on a corresponding stop element 204 of the cover 16.

On account of the torsion spring 94 which is still tensioned even in the active position of the wind blocker 12, this holds the wind blocker 12 in its active position due to the fact that it keeps the stop element 202 constantly in abutment on the stop element 204.

Figure 12:
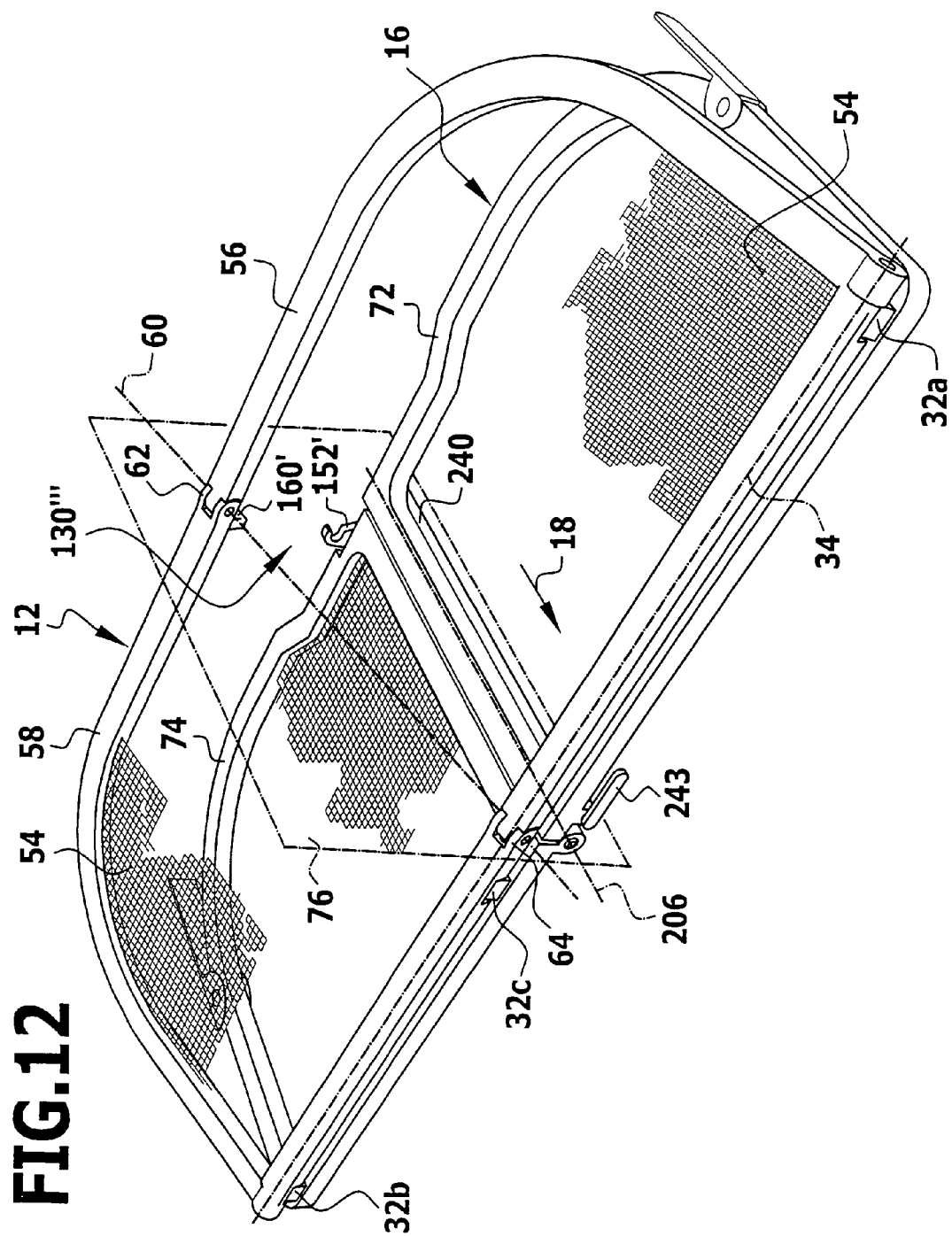
FIG. 12 shows a view similar to FIG. 3 of a fifth embodiment of a wind stop device according to the invention.

In a fifth embodiment of a wind stop device according to the invention, illustrated in FIG. 12, the wind blocker 12 comprises in the same way as in the first embodiment two frame parts 56 and 58 which are pivotable relative to one another about the pivot axis 60 by means of the hinges 62 ad 64, as already described in detail in conjunction with FIGS. 1 and 3 of the first embodiment.

Furthermore, one of the frame parts 56, 58 is mounted on the cover part 72 so as to be pivotable about the axis 34 by means of the joints 32a, 32b and 32c.

In this respect, the frame part 58 is mounted, for example, on the cover part 72 so as to be pivotable about the axis 34 via the joints 32b and 32c, wherein the joints 32b and 32c are arranged on opposite sides of the frame part 58 so that, altogether, a permanent, pivotable mounting of the frame part 58 on the cover part 74 by means of the joints 32b and 32c is present.

In addition, a releasable joint 32c is provided, with which the frame part 56 is mounted on the cover part 72 so as to be pivotable in the non-released state.

In the released state of the joint 32a, the cover part 72 and the frame part 56 can then be separated from one another.

In addition to the pivotability of the frame parts 56 and 58 about the pivot axis 60 relative to one another, the cover parts 72 and 74 are pivotable about an axis 206 but not until the releasable joint 32a is released so that the cover part 72 is pivotable against the cover part 72 about the axis 206 from below, i.e., from a side facing away from the wind blocker 12.

For this purpose, the two cover parts 72 and 74 are, for their part, mounted on one another by means of joints 210.

Such a folding of a wind stop device is described, for example, in European patent application 01 124 855.6.

Figure 13:
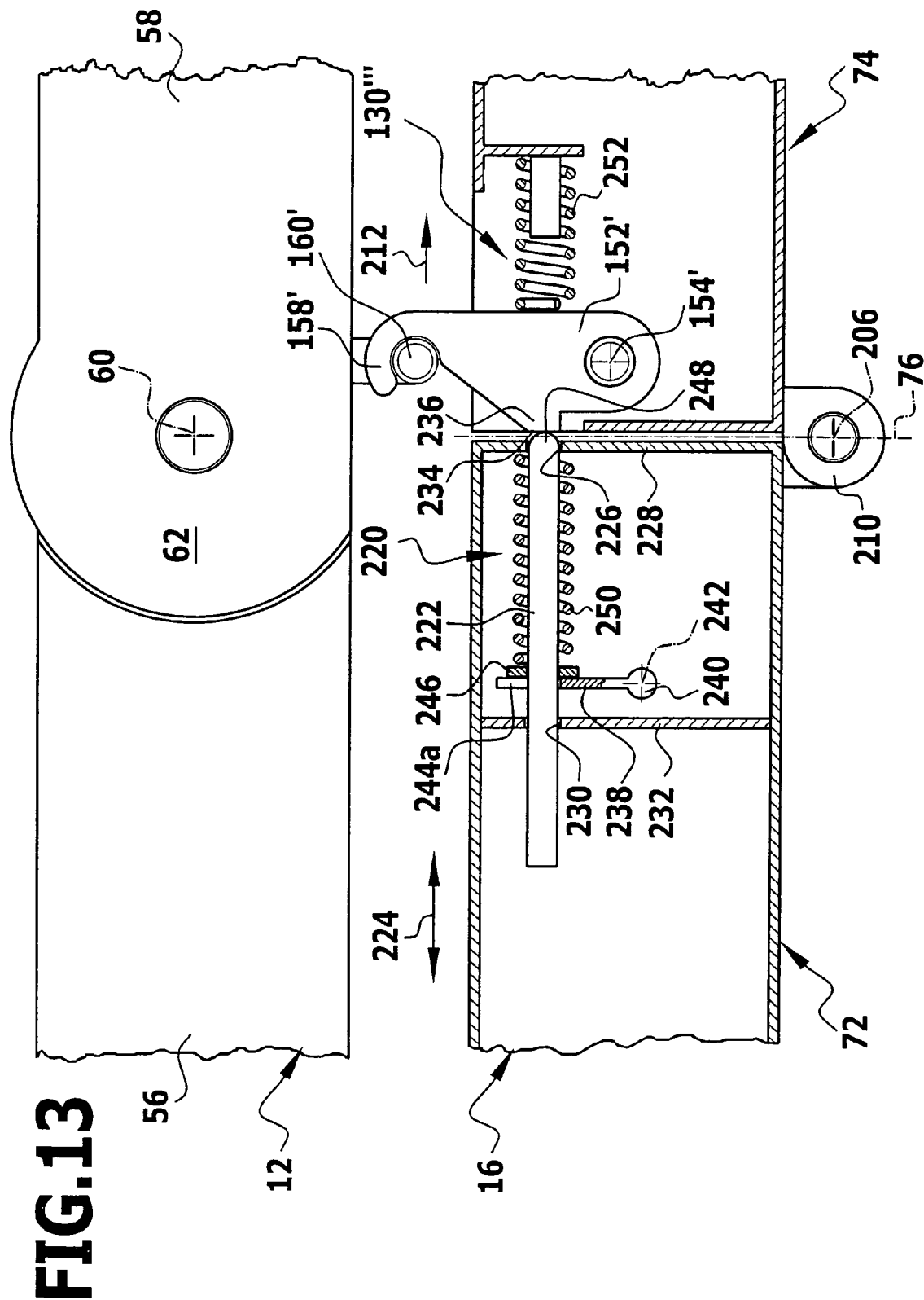
FIG. 13 shows a section through the cover in the area of a fixing device and an actuating device associated with it in the fifth embodiment.

In order to prevent the wind blocker 12 from moving automatically with the frame parts 56 and 58 from its inactive position into its active position when driven in accordance with the first four embodiments, a fixing device 130''' is provided in the cover part 74, as illustrated in FIG. 13, and this comprises as blocking element a pivotable locking element 152' which is mounted in the cover part 74 so as to be pivotable about an axis 154' and with its locking element nose 158' engages behind the locking element receiving means 160 arranged on the frame part 58 in order to fix the wind blocker 12 in position.

Figure 14:
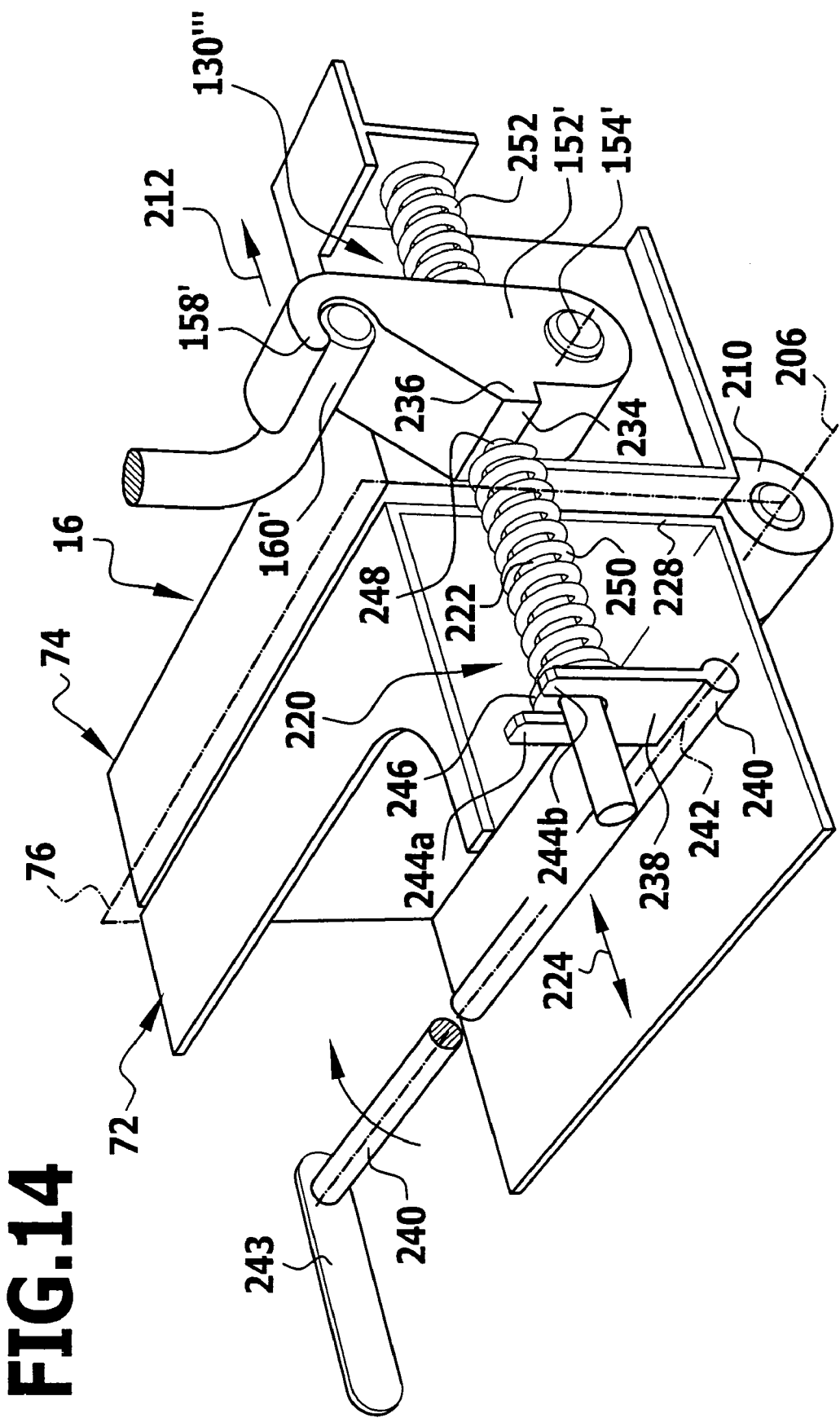
FIG. 14 shows an exploded illustration of the fixing device and the actuating device in the state holding the wind blocker in its inactive position.

In order to move the pivotable locking element 152' from its blocking position or locking position illustrated in FIGS. 13 and 14 in a direction 212 and, therefore, to bring the locking element nose 158' out of engagement with the locking element receiving means 160', it is conceivable to actuate this directly manually, for example, via a nose integrally formed on the pivotable locking element 152'.

In the embodiment illustrated in FIGS. 12 to 16, an actuating device designated as a whole as 220 is provided which is not arranged in the same cover part but in the respectively other cover part, i.e., in this case in the cover part 72.

The actuating device 220 comprises an actuating slide 222 which is mounted in the cover part 72 so as to be displaceable in a direction of displacement 224, for example, due to the fact that this actuating slide 222 passes, on the one hand, through an opening 226 in a side wall 228 located so as to face the cover part 74 and, on the other hand, due to the fact that the actuating slide 222 passes through an opening 230 in an intermediate wall 232 which is located, for example, in the frame 188 of the cover part 72.

In the simplest case, the actuating slide 222 is designed as an actuating bolt and the openings 226 and 230 are bores which mount the actuating slide 222 for displacement in the direction of displacement 224 which extends approximately parallel to the axis 34.

The actuating slide 222 is, as illustrated in FIG. 13 and FIG. 14, arranged such that it is in a position to engage beyond the plane of separation 76 when a wind stop device is mounted on the vehicle body 10 and to act on a pressure surface 234 on an actuating nose 236 of the pivotable locking element 152' in order to pivot this such that its locking element nose 158 releases the locking element receiving means 160.

A displacement of the actuating slide 222 could, on the one hand, be brought about by direct manual action on it.

One advantageous solution provides for the actuating slide 222, as illustrated in FIGS. 13 and 14, to be movable by means of an actuating fork 238 which is seated on a shaft 240 which is mounted, for its part, on the cover part 72 so as to be rotatable about an axis 242.

The shaft 240 preferably extends as far as an actuating lever 244 which, as illustrated in FIG. 12, is arranged on a side of the cover part 72 facing a driver, wherein the side of the cover part 72 facing the driver is the side, on which the axis 34 also extends, about which the wind blocker 12 is pivotable relative to the cover 16 between the inactive and the active position.

In the case of the actuating device 220 according to the invention, the actuating fork 238 with its fork fingers 244a and 244b acts on a ring 246 which is rigidly connected to the actuating slide 222 when the actuating slide 222 is intended to be displaced in the direction of the pivotable locking element 152' in order to act on the pressure surface 234 on the actuating nose 236 thereof with an actuating head 248.

In order to, on the other hand, keep the actuating slide 222 in its position not acting on the pressure surface 234 with the actuating head 248, a pressure spring 250 is provided, as illustrated in FIGS. 12 and 14, and this spring is supported, on the one hand, on the side wall 228 and acts on a side of the ring 246 located opposite the fork fingers 244a, b and, therefore, moves the actuating slide 222 into its position not actuating the pivotable locking element 152', in which the ring 246 acts, for example, on the fork fingers 244a, b of the actuating fork 238 and pivots them about the axis 242 in such a manner that the fork fingers 244a, b abut on the intermediate wall 232 which, in this case, serves at the same time as a stop for the securing of the position of the actuating slide 222, in which this does not act on the pivotable locking element 152'.

Figure 15:
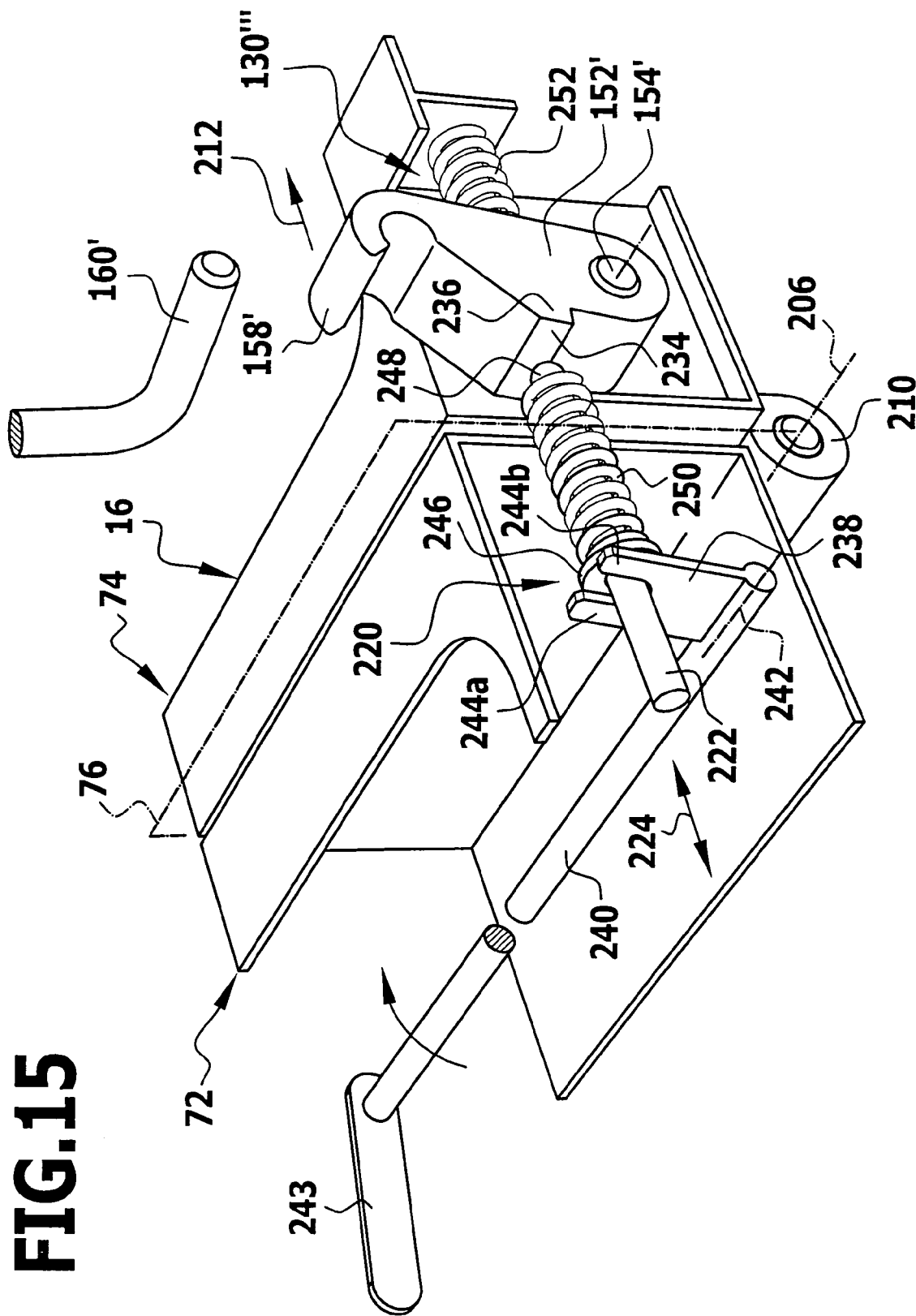
FIG. 15 shows an illustration similar to FIG. 14 following release of the wind blocker in its state fixed relative to the cover.

As a result of a temporary action on the actuating lever 243, it is possible to move the pivotable locking element 152' with the actuating slide 222 into its position releasing the locking element receiving means 160 or release position so that, as illustrated in FIG. 15, the locking element receiving means 160' is released in order to allow the wind blocker 12 to move from the inactive into the active position due to the action of the drive 90.

In order, on the other hand, to also keep the pivotable locking element 152' in its locking position in a defined manner, a pressure spring 252 is also provided in the cover part 74 and this acts on the pivotable locking element 152' accordingly.

Figure 16:
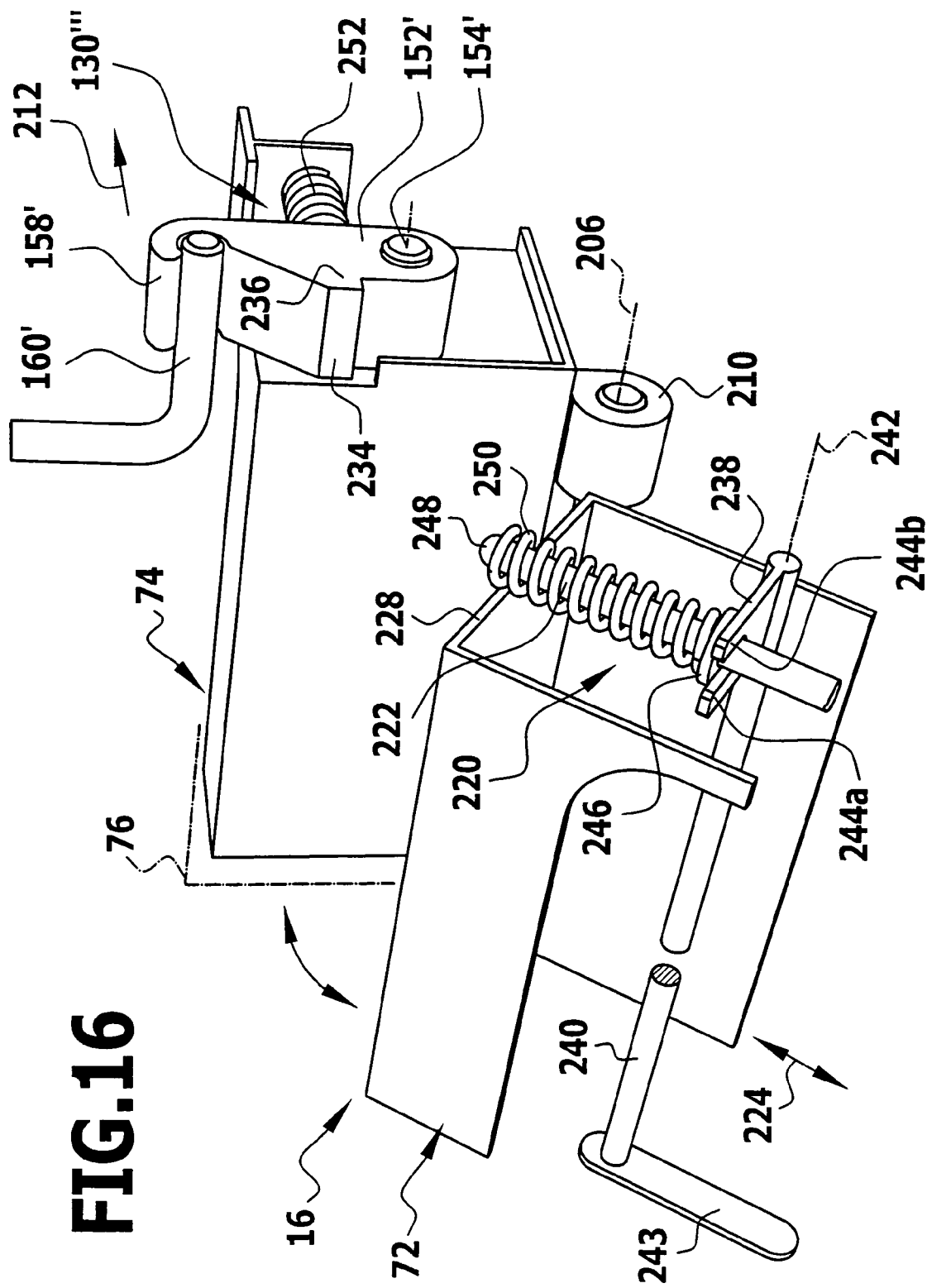
FIG. 16 shows an illustration of a folding together of the cover parts of the cover during inactivation of the actuating device.

The fact that, on the one hand, the fixing device 130'' is arranged in the one cover part, for example, in the cover part 74 and the actuating device 220 is arranged in the other cover part, namely, for example, in the cover part 72 has the advantage that, as illustrated in FIG. 16, the actuating slide 222 with its actuating head 248 is moved to such a distance away from the pressure surface 234 of the pivotable locking element 152' during the pivoting of the cover parts 72, 74 towards one another about the axis 206 that even an actuation of the actuating lever 243 cannot lead to the actuating head 248 acting on the pressure surface 234 and, therefore, not being in a position to release the fixing of the frame part 58 on the cover part 74 and so the frame part 58 remains fixed in position in its state lying on the cover part 74, on the one hand, due to the joints 32b and 32c and, on the other hand, due to the fixing device 130''' even when the cover part 72 is folded from below against the cover part 74 and the frame part 56 from above against the frame part 58.

An actuation of the pivotable locking element 152' via the actuating lever 243 is only possible again when the cover part 72 is in its unfolded position relative to the cover part 74, in which the cover parts 72 and 74 cover the section 20 of the passenger compartment opening 22. As a result, the fixing of the frame part 58 on the cover part 74 is always secured against any unintentional release when the cover part 72 is pivoted in relation to the cover part 74.

Figure 17:
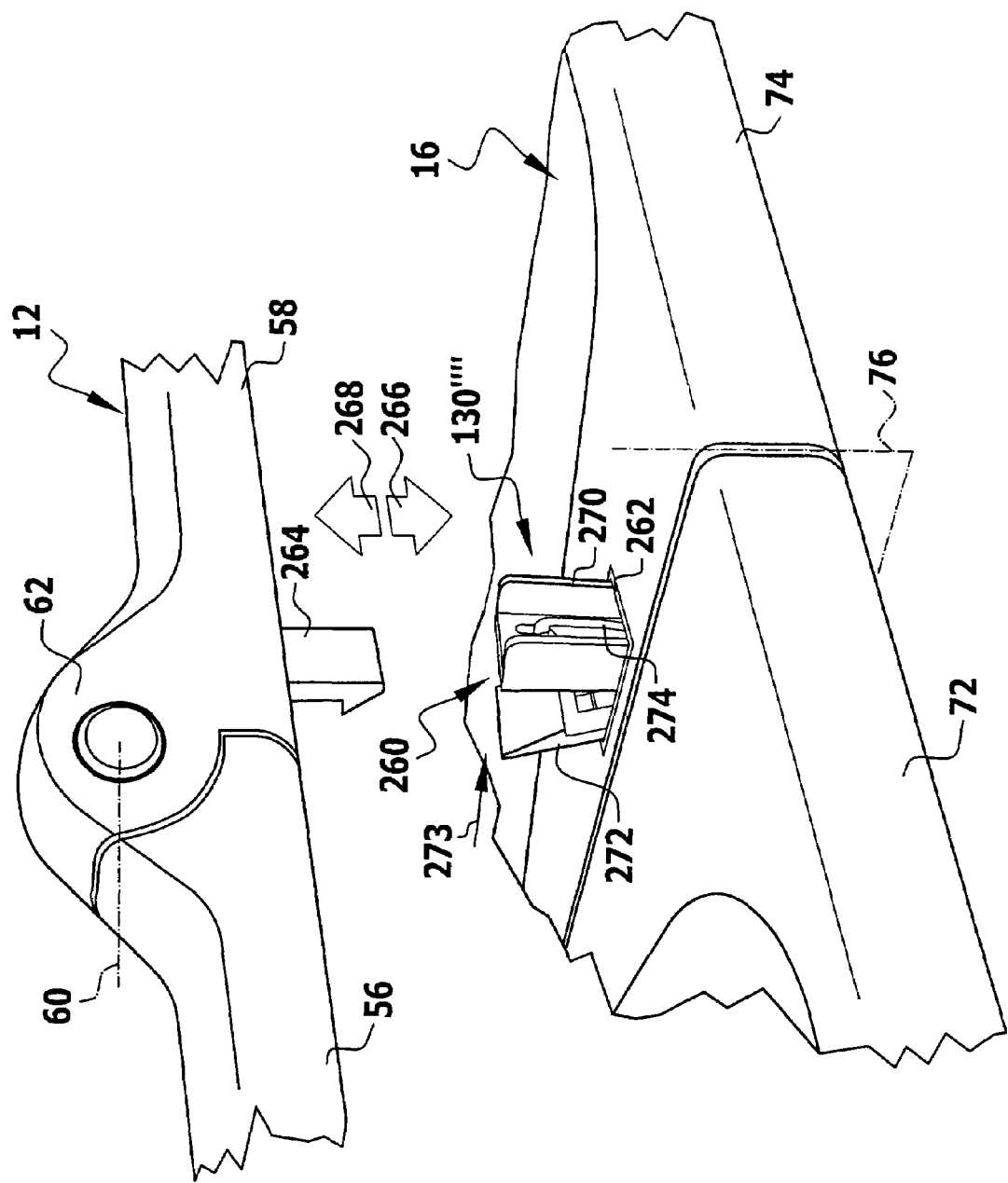
FIG. 17 shows a perspective illustration of a sixth embodiment with a fixing device designed as a catch device.
Figure 18:
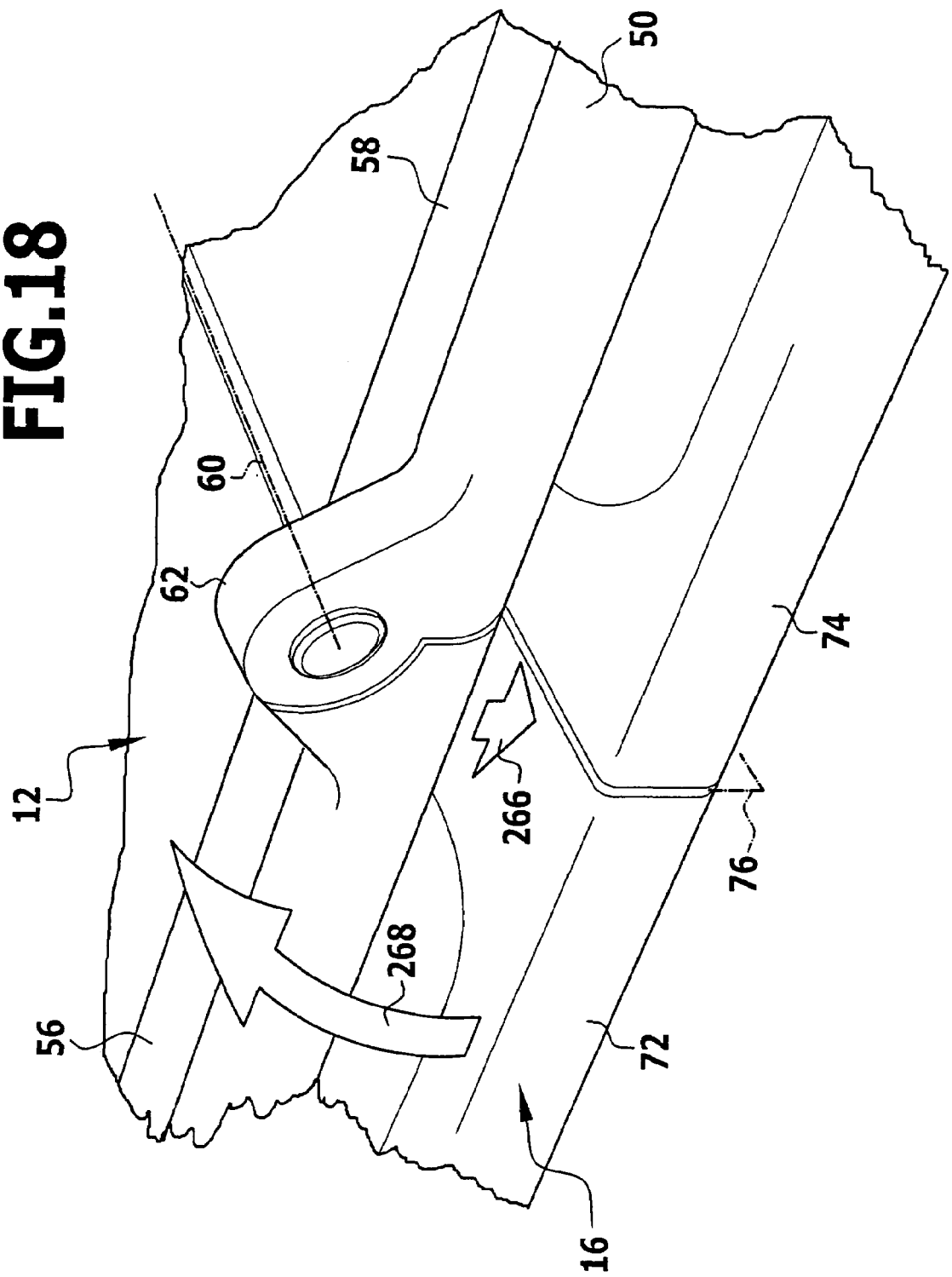
FIG. 18 shows an illustration similar to FIG. 17 of the sixth embodiment with the wind blocker in its inactive position fixed to one of the cover elements.

In a sixth embodiment of a wind stop device according to the invention, illustrated in FIGS. 17 and 18, a fixing device designated as a whole as 130'''' is provided on the cover part 74 and this is arranged close to the plane of separation 76.

The fixing device 130'''' is, in this respect, designed as a catch device which comprises a catch slide 260 which is mounted in a catch slide housing 262 provided in the cover part 74 and serves the purpose of securing or releasing a catching element 264, which is arranged on the frame part 58, relative to the cover part 74.

For this purpose, the catching element 264 provided on the frame part 58 is movable in a pivot-in direction 266 towards the catch device 130'''', engages in the catch slide 260 shortly before the inactive position of the wind blocker 12 is reached and, during further pivoting of the wind blocker 12 in the pivot-in direction 266 in order to reach the inactive position thereof, is moved from its release position illustrated in FIG. 17 further in the pivot-in direction 266 together with the catch slide 260 so that the catch slide 260 enters the catch slide housing 262 and when the inactive position of the wind blocker 12 is reached itself reaches a blocking position, in which the catch slide 260 is prevented from moving in a pivot-out direction 268 and, therefore, from moving out of the catch slide housing 262.

When the catch slide 260 is moved into the catch slide housing 262, the catch slide 260 grips the catching element 264 and thereby transfers into its position securing the catching element 264 so that in the blocking position of the catch slide 260 the catching element 264 no longer has the possibility of being released from the catch slide 260. In this case, the wind blocker 12, as illustrated in FIG. 18, is secured with its frame parts 56 and 58 relative to the cover 14 with the cover parts 72 and 74, wherein the wind blocker 12 is in its inactive position.

Proceeding from the inactive position of the wind blocker 12, in which the catch slide 260 holds the catching element 264 secure, the catch slide 260 may be moved further into the catch slide housing 262 due to further movement of the wind blocker 12 in the pivot-in direction 266, thereby leaves its blocking position and can then be moved, driven by the drive 90 acting constantly on the wind blocker 12, together with the catching element 264 in a pivot-out direction 268 out of the catch slide housing 262 into its release position, in which the catch slide 260 releases the catching element 264 and itself remains in this position so that the wind blocker 12 can transfer altogether from its inactive position into its active position due to action of the drive 90.

Figure 19:
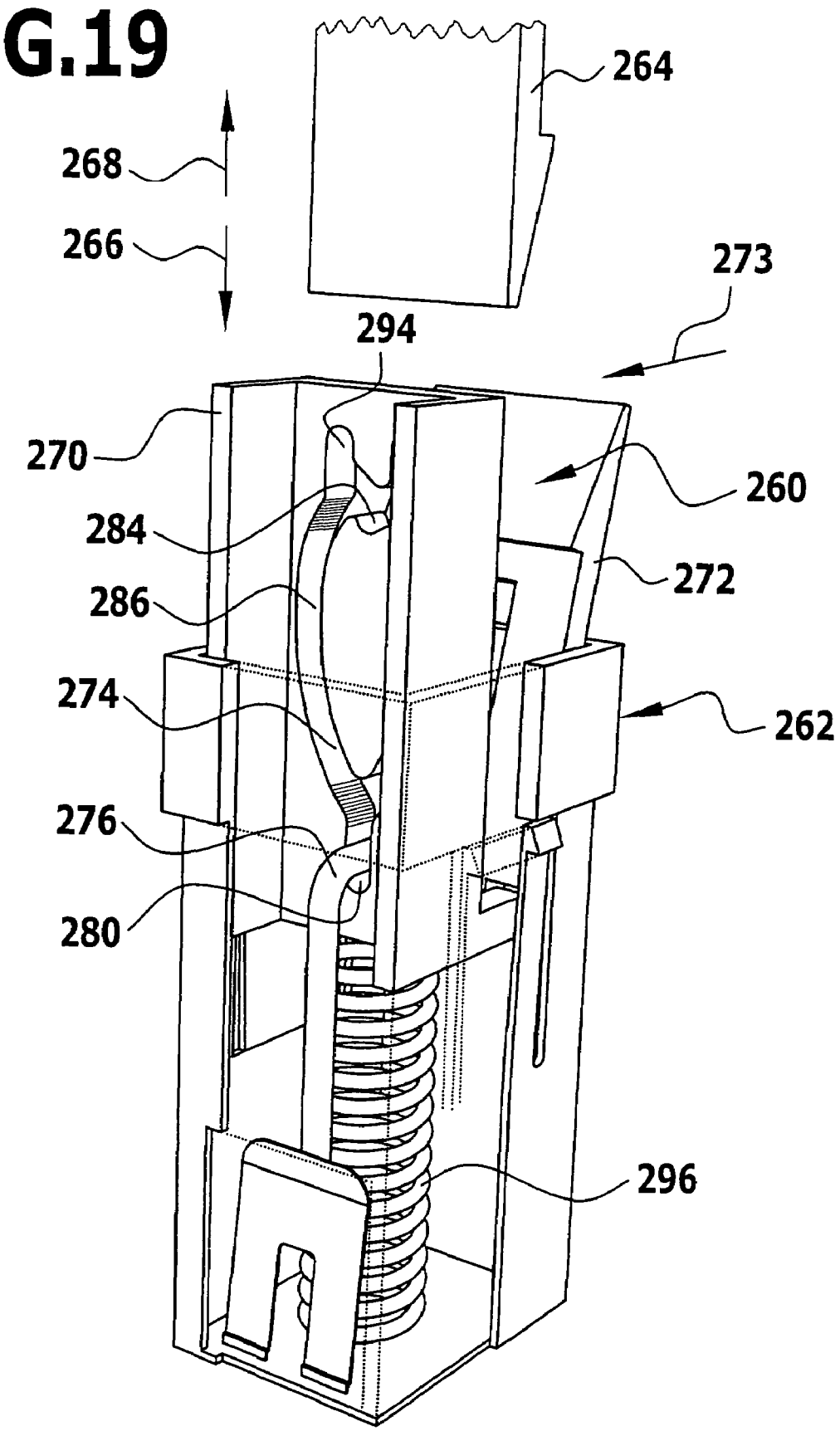
FIG. 19 shows a perspectively enlarged illustration of the fixing device of the sixth embodiment designed as a catch device.

As illustrated in FIG. 19 in detail, the catch slide 260 comprises a guide member 270 as well as a catcher element 272 movably connected to the guide member 270 which can be moved together in the pivot-in direction 266 as well as contrary thereto in the pivot-out direction 268 relative to the catch slide housing 262.

Moreover, the catcher element 272 can be moved transversely to the pivot-in direction 266 and to the pivot-out direction 268 in a catch direction 273 towards the guide member 70 into a position securing the catching element 264 or can be moved away from it contrary to the catch direction 273 into a position releasing the catching element 264, as illustrated in FIG. 17 and FIG. 19.

Furthermore, the guide member 270 is provided with a guide path 274, in which a path follower 276 held on the catch slide housing 262 is movable due to displacement of the guide member 270 in the pivot-in direction 266 or the pivot-out direction 268.

The guide path 274 comprises a base section 280 which is adjoined by an ascending section 282 which merges into a retaining section 284 and the retaining section 284 merges into a descending section 286 which opens again into the base section 280.

Furthermore, respective deflecting sections 292 and 294 are provided at the transfer from the ascending section 282 to the retaining section 284 and at the transfer from the retaining section 284 to the descending section 286, wherein the deflecting section 292 deflects the path follower 276 into the retaining section 284 at the end thereof when the path follower is moving in the ascending section 282 and the deflection section deflects the path follower into the descending section 286 when it is moving in the retaining section 284.

In the position of the catch slide 260 moved into the catch slide housing 262 in the pivot-in direction 266, the path follower 276 is located in the retaining section 284 of the guide path 274 and prevents the catch slide 260 from leaving this position by blocking any movement of the guide member 270 and so the guide member 270 and with it also the catch slide 260 are in a blocking position, in which the catcher element 272 is, in addition, in its position securing the catching element 264, moved towards the guide member 270, and, for example, engages behind a projection of the catching element 264 in this position. The position of the catcher element 272 relative to the guide member 270 is secured by the catch slide housing 262 which keeps the catcher element 262 in a position moved towards the guide member 270 due to action of a corresponding guide on the catch slide housing 262 in the blocking position of the catch slide 260.

Figure 20:
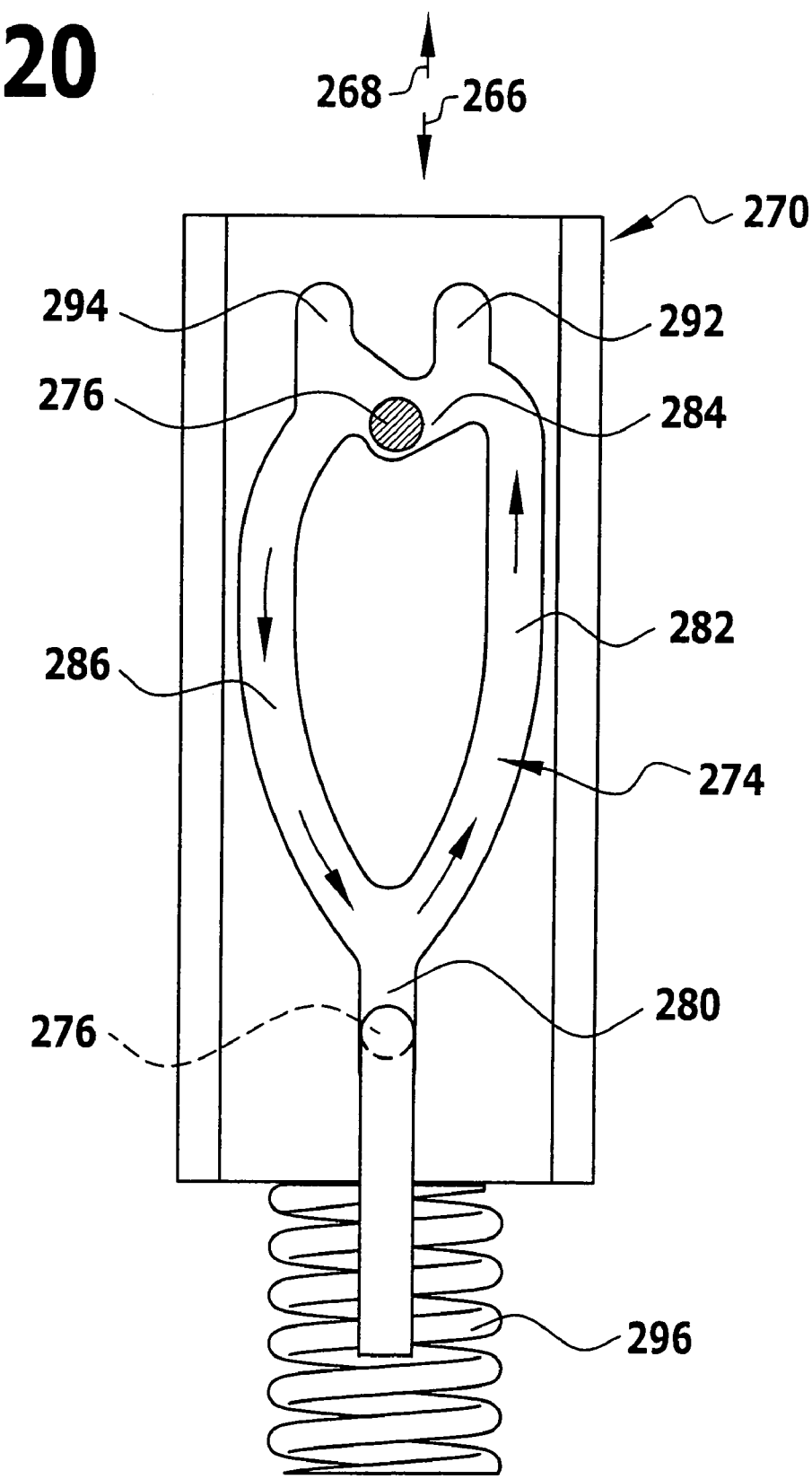

If the entire catch slide 260 is now acted upon in the pivot-in direction 266, this results in the guide member 270 also being moved in this direction and, therefore, the path follower 276 being moved into the deflecting section 294 this path follower, during a subsequent release of the action on the catch slide 260 and, therefore, on the guide member 270 and, therefore, on account of the movement of the wind blocker 12 with the catching element 264 due to the drive 90, being able to glide along in the descending section 286 in the pivot-out direction 268 as far as the base section 280, in which the path follower 276 finally takes up the position illustrated by dotted lines in FIG. 20. As a result, the guide member 270 and, therefore, also the catch slide 260 have the possibility of moving out of the catch slide housing 262 in the pivot-out direction 268, wherein at the same time a movement of the catcher element 272 into the position releasing the catching element 264 takes place due to action of a corresponding guide on the catch slide housing 262, where applicable aided by a spring, and so it can no longer engage behind the catching element 264.

As a result, the catching element 264 has the possibility of moving in the pivot-out direction 268 free from the catch slide 260 and so, in the end, the wind blocker 12 transfers from the inactive position into the active position due to action of the drive 90.

In this respect, the catch slide 260 projects, in its release position, as already illustrated in FIG. 17, beyond the catch slide housing 262 in the pivot-out direction 268.

During a renewed movement of the wind blocker 12 into its inactive position, the catching element 264 is moved in the direction of the catch slide 260 and engages in the catch slide 260 shortly before the inactive position of the wind blocker 12 is reached in such a manner that the catching element 264 comes to rest between the guide member 270 and the catcher element 272.

A further displacement of the catch slide 260 in the pivot-in direction 266, on account of the corresponding movement of the wind blocker 12, results in the catch slide 260 and, with it, the guide element 270 moving into the catch slide housing 262 proceeding from the release position illustrated in FIG. 17, wherein, in this case, the path follower 266 reaches the deflecting section 292 from the base section 280 via the ascending section 284 and after termination of the movement of the wind blocker 12 in the pivot-in direction 266 due to release of the same transfers into the retaining section 284 on account of the deflecting section 292 during a slight movement in the pivot-out direction 268 so that, on the other hand, the catch slide 260 is in a blocking position in the catch slide housing 262 and, in this respect, is blocked in this position by the path follower 276 which acts on the guide element 270. In addition, in the blocking position—as already described—the catcher element 272 is in its position securing the catching element 264 and so the wind blocker 12 is again held in its inactive position.

Only renewed action on the catch slide 260 and, therefore, on the guide member 270 in the direction of the pivot-in direction 266 opens up the possibility of the path follower 276 again transferring from the retaining section 284 into the deflecting section 294 and therefore opens up the chance of the guide member 270 of the catch slide 260 having the possibility, after release of the wind blocker 12, of transferring into the base section 280 via the descending section 286.

In order to keep the catch slide 260 always acted upon in the direction of the pivot-out direction 268, a pressure spring 296 is provided which acts on the catch slide 260 and always acts on it in the direction of its release position, in which the catcher element 272 is in its position releasing the catching element 264, and, therefore, also counteracts any manual action via the wind blocker 12 and the catching element 264 on the catch element 260 in the pivot-in direction 266 and always acts on the catch slide 260 such that this has the tendency to transfer into its release position which is merely prevented in the blocking position by the path follower 276.

With respect to the remaining design of the wind stop device, the same reference numerals have been used for the same parts and so reference can be made in full to the comments on the preceding embodiments.

In a seventh embodiment, illustrated in FIG. 21, those parts which are identical to the corresponding parts of the first embodiment are given the same reference numerals and so reference can be made in full to the comments on the first embodiment with respect to their description.

In contrast to the first embodiment, the drive 90' of the fourth embodiment for pivoting the wind blocker 12 is not designed as a spring drive but rather this comprises an electric motor 300 which drives, via a gear 302, a shaft 304 which is secured in the bearing flange 82 so as to be non-rotatable.

When current is supplied to the electric motor 300, the shaft 304 turns and, therefore, the wind blocker frame 50 turns about the axis 34 extending coaxially to an axis of the shaft 304 and, therefore, the wind blocker frame 50 and, therefore, the wind blocker 12 may be pivoted about the axis 34 due to current being supplied to the electric motor 300, wherein on account of the gear 302 the wind blocker 12 remains in the respective position, in which a supply of current to the electric motor 300 is interrupted.

The stabilization of the wind blocker 12 in the respective position may also be improved due to the fact that the gear 302 is a self-locking gear and, therefore, the position once brought about by the electric motor 300 will be maintained for such a time until the electric motor 300 again drives the gear 302 in order to pivot the wind blocker 12 relative to the cover 16.

As a result, the fixing devices 130, 130', 130", 130'" and 130"" specified in conjunction with the first three embodiments can be left out in this sixth embodiment.

The activation of the electric motor 300 is preferably brought about via a control for the wind stop device which is provided on the wind stop device or via a control provided on the motor vehicle.

This control is expediently provided, in addition, with a torque recognition which allows it to interrupt the movement of the wind blocker when any resistance hindering the movement of the wind blocker occurs since the risk then exists, for example, of an operator possibly being injured, for example, due to the fact that parts of the operator's body become trapped or the risk of damage to the electric drive exists.

As for the rest, the connection of the wind blocker device according to the invention to the vehicle body is brought about in the same way as that described in conjunction with the first or fourth embodiments.

What is claimed is:

1. A wind stop device for convertible motor vehicles, comprising:
    a cover for a section of a passenger compartment opening of a vehicle body, said cover being arranged at a belt line of the vehicle body;
    a wind blocker connected to the cover via joints, said wind blocker being pivotable from an inactive position resting on the cover into an active position raised above the belt line of the vehicle body, the wind blocker extending transversely to the cover in said active position; and
    a drive for moving the wind blocker at least from the inactive position into the active position, the drive being associated with at least one of the joints, and
    the drive is integrated in a bearing member of the at least one joint.

2. A wind stop device as defined in claim 1, wherein the bearing member is integrated into a wind blocker frame.

3. A wind stop device as defined in claim 2, wherein the bearing member is arranged in a corner area of the wind blocker frame.

4. A wind stop device as defined in claim 1, wherein the bearing member is integrated into the cover.

5. A wind stop device as defined in claim 4, wherein the bearing member is integrated into a cover part.

6. A wind stop device as defined in claim 5, wherein the bearing member is arranged in a corner area of the cover part.

7. A wind stop device as defined in claim 1, wherein the drive comprises a spring elastic energy storing member.

8. A wind stop device as defined in claim 7, wherein the spring elastic energy storing member is designed such that it has stored the maximum energy in the inactive position of the wind blocker.

9. A wind stop device as defined in claim 7, wherein the spring elastic energy storing member has stored the minimum energy in the active position of the wind blocker.

10. A wind stop device as defined in claim 7, wherein the spring elastic energy storing member comprises a torsion spring.

11. A wind stop device as defined in claim 7, wherein the spring elastic energy storing member and a damping element are associated with the same joint.

12. A wind stop device as defined in claim 1, wherein a damping element is associated with the drive.

13. A wind stop device as defined in claim 12, wherein the damping element is associated with at least one of the joints.

14. A wind stop device as defined in claim 13, wherein the damping element is integrated into the respective joint.

15. A wind stop device as defined in claim 1, wherein the drive is designed as an electric drive.

16. A wind stop device as defined in claim 15, wherein the electric drive comprises an electric drive motor.

17. A wind stop device as defined in claim 16, wherein the drive comprises a gear driven by the electric drive motor.

18. A wind stop device as defined in claim 17, wherein the gear is designed as a self-locking gear.

19. A wind stop device as defined in claim 1, wherein the wind blocker is adapted to be fixed in the inactive position in relation to the cover with a fixing device.

20. A wind stop device as defined in claim 19, wherein the fixing device comprises a blocking element, said blocking element transferring automatically into a blocking position and being manually transferable into a release position.

21. A wind stop device as defined in claim 19, wherein the fixing device is arranged on the vehicle body.

22. A wind stop device as defined in claim 19, wherein the fixing device is arranged on the cover or the wind blocker.

23. A wind stop device as defined in claim 22, wherein the fixing device is arranged in the area of at least one of the joints.

24. A wind stop device as defined in claim 19, wherein the fixing device is arranged on the cover.

25. A wind stop device as defined in claim 24, wherein the fixing device is arranged on one of the cover parts.

26. A wind stop device as defined in claim 25, wherein:
    the fixing device is actuatable by an actuating device, said actuating device being adapted to act on said fixing device for releasing the wind blocker from the inactive position; and
    the actuating device is arranged on the respectively other cover part.

27. A wind stop device as defined in claim 26, wherein the fixing device is actuatable by the actuating device, said actuating device being adapted to act on said fixing device beyond a plane of separation in an unfolded state of the cover.

28. A wind stop device as defined in claim 19, wherein the fixing device is actuatable by an actuating device, said actuating device being adapted to act on said fixing device for releasing the wind blocker from the inactive position.

29. A wind stop device as defined in claim 28, wherein the actuating device has an actuating lever arranged on the driver's side of the cover.

30. A wind stop device as defined in claim 28, wherein after an unfolded state of the cover has been left the fixing device is no longer actuatable by the actuating device.

31. A wind stop device as defined in claim 30, wherein the actuating device has an actuating head, the fixing device being acted upon by the actuating head by it engaging beyond a plane of separation.

32. A wind stop device as defined in claim 30, wherein after the unfolded state of the cover has been left the actuating head is at such a distance from the fixing device that the fixing device is no longer actuatable.

33. A wind stop device as defined in claim 19, wherein the fixing device is designed such that the fixing device transfers into a blocking position during movement of the wind blocker in a pivot-in direction.

34. A wind stop device as defined in claim 33, wherein the fixing device located in the blocking position is designed such that it transfers into a release position due to movement of the wind blocker in the pivot-in direction and subsequent movement in a pivot-out direction.

35. A wind stop device as defined in claim 33, wherein the fixing device is designed as a catch device, a catching element being securable in said catch device.

36. A wind stop device as defined in claim 35, wherein the catch slide is movable between the blocking position and the release position due to action of the catching element.

37. A wind stop device as defined in claim 35, wherein the fixing device comprises a catch slide movable between a release position moved out of a catch slide housing in the pivot-out direction and a blocking position moved into the catch slide housing in the pivot-in direction.

38. A wind stop device as defined in claim 37, wherein the catch slide comprises a guide member and a catcher element connected to the guide member so as to be movable, said catcher element being located in a position securing the catching element in the blocking position and in a position releasing the catching element in the release position.

39. A wind stop device for convertible motor vehicles, comprising:
a cover for a section of a passenger compartment opening of a vehicle body, said cover being arranged at a belt line of the vehicle body;
a wind blocker connected to the cover via joints, said wind blocker being pivotable from an inactive position resting on the cover into an active position raised above the belt line of the vehicle body, the wind blocker extending transversely to the cover in said active position; and
a drive for moving the wind blocker at least from the inactive position into the active position;
the drive being associated with at least one of the joints;
the drive and the at least one joint forming a unit; and
the unit is integrated in the cover.

* * * * *